(12) United States Patent
Schut et al.

(10) Patent No.: US 7,094,277 B2
(45) Date of Patent: Aug. 22, 2006

(54) COUNTERION USE FOR REDUCTION OF DECAP AND FOR IMPROVEMENT OF DURABILITY OF INKJET IMAGES

(75) Inventors: David M. Schut, Philomath, OR (US); Christian Schmid, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/004,148

(22) Filed: Oct. 31, 2001

(65) Prior Publication Data

US 2003/0127017 A1 Jul. 10, 2003

(51) Int. Cl.
*C09D 11/02* (2006.01)

(52) U.S. Cl. .................... 106/31.27; 106/31.43; 106/31.48; 106/31.49; 106/31.5; 106/31.51; 106/31.52; 106/31.58; 106/31.59

(58) Field of Classification Search .......... 106/31.27, 106/31.52, 31.48, 31.51, 31.43, 31.49, 31.5, 106/31.58, 31.59
See application file for complete search history.

(56) References Cited

U.S. PATENT DOCUMENTS

| | | | |
|---|---|---|---|
| 4,028,357 A | 6/1977 | Crounse | 544/198 |
| 4,189,427 A | 2/1980 | Komorowski | 534/659 |
| 4,248,949 A | 2/1981 | Hara et al. | 430/17 |
| 4,514,226 A | 4/1985 | Leoffler | 106/31.48 |
| 4,725,675 A | 2/1988 | Meininger et al. | 534/638 |
| 4,767,844 A | 8/1988 | Ando et al. | 534/573 |
| 5,043,013 A * | 8/1991 | Kluger et al. | 106/31.32 |
| 5,102,459 A | 4/1992 | Ritter et al. | 106/31.36 |
| 5,176,745 A * | 1/1993 | Moore et al. | 106/31.27 |
| 5,310,887 A * | 5/1994 | Moore et al. | 534/729 |
| 5,668,260 A * | 9/1997 | Bauer et al. | 534/806 |
| 5,830,265 A | 11/1998 | Tsang et al. | 106/31.75 |
| 5,935,309 A * | 8/1999 | Moffatt et al. | 106/31.27 |
| 6,056,811 A | 5/2000 | Shimomura et al. | 106/31.36 |
| 6,113,677 A * | 9/2000 | Kaufmann | 106/31.27 |
| 6,162,846 A | 12/2000 | Botros | |
| 6,221,139 B1 | 4/2001 | Schut | 106/31.43 |
| 6,221,143 B1 | 4/2001 | Palumbo | 106/31.6 |
| 6,342,617 B1 * | 1/2002 | Harris | 552/101 |
| 2003/0056690 A1 * | 3/2003 | Wang et al. | 106/31.27 |

FOREIGN PATENT DOCUMENTS

| | | |
|---|---|---|
| EP | 0 328 375 | 8/1989 |
| EP | 0 563 907 | 10/1993 |
| EP | 0 626 428 | 11/1994 |
| EP | 0 899 310 | 3/1999 |
| EP | 0 971 003 | 1/2000 |
| WO | WO 01/25340 | 4/2001 |

OTHER PUBLICATIONS

Schut, et al., "Water–Soluble Organometallic Complexes. Synthesis of Water–Soluble Derivatives of Cyclopentadienyl Ligands", New J. Chem. 20: 113–120, 1996, No Month Available.

Borch, et al., "The Cyanohydridoborate Anion as a Selective Reducing Agent", Journal of the American Chemical Society, 93(12): 2900–2904,. Sep. 1971.

Lane, "Sodium Cyanoborohydride—A Highly Selective Reducing Agent for Organic Functional Groups", Synthesis, 135–146, Mar. 1975.

Boutigue, "Reactions du Borocyanohydrure. Aminiations Reductrices Regio–Selectives de Cetones Steroidiques", Bull Soc Chim Fr, 2: 750–753, 1973, No Month Available.

Yee, et al., "Carbonyl Transposition Studies", J. Org. Chem., 44(5): 1979, No Month Available.

\* cited by examiner

*Primary Examiner*—Helene Klemanski

(57) ABSTRACT

A dye for ink-jet printing on both hydrophilic and hydrophobic papers. The dye includes a chromophore ionically coupled to a counterion. One of the chromophore and the counterion includes a hydrophilic moiety. The other includes a hydrophobic moiety.

24 Claims, 2 Drawing Sheets

COUNTERION USE FOR REDUCTION OF DECAP AND FOR IMPROVEMENT OF DURABILITY OF INKJET IMAGES

FIELD OF THE INVENTION

This invention pertains to the use of improved dyes in inks for inkjet printing; and, more specifically, to the selection of counterions to be used with these same dyes to improve ink and printing properties.

BACKGROUND OF THE INVENTION

Typical inkjet inks employ anionic dyes that are neutralized with cations such as $Na^+$ and/or $Li^+$. The demand for fast drying inks has also led to an increase in the use of organic solvents in the ink. However, the limited range of miscibility of these organic solvents in an aqueous-based ink often leads to phase separation, especially at higher temperatures, and consequently reduces the solubility of the dye. This low solubility of the dye in turn degrades the decap performance of the inkjet pen. Additionally, because many of the organic solvents often have a greater boiling point than the corresponding aqueous-based inks, evaporation of water during inkjet drop ejection also leads to precipitation of the dye. This in turn increases the dye concentration of the ink around the nozzle portion of the inkjet pen, thereby saturating the ink vehicle. Because this phenomenon takes place near the nozzle portion of the inkjet pen, it also degrades decap performance. Short term decap performance refers to the time period in between successive firings a nozzle can tolerate without a defect. Long term decap performance refers to the level of nozzle recovery after the nozzles have been idle for an extended period of time. Use of counterions, such as $NH_4^+$, in ink formulations can improve the decap performance of inks for inkjet printing. Still, it is desirable to improve the solubility of dyes in organic-based inks without suffering from the disadvantages of decreased decap performance (U.S. Pat. Nos. 6,221,143, issued Apr. 24, 2001, and 5,830,265, issued Nov. 3, 1998, and PCT Publication WO 01/25340, published Apr. 12, 2001).

Solubility is proportional to the strength of the non-covalent molecular interactions between the solute and the solvent molecules. Increased ink solubility in organic-based vehicles results in part from an increase in the hydrophobic interactions between the dye and the ink vehicle. The increased hydrophobicity of the dye molecules that increases solubility in organic-based vehicles also enhances interactions between the dye and hydrophobic print media, such as offset coated papers. These interactions increase the durability of the printed ink on such media; however, customers do not purchase an ink with the intent to use it solely on hydrophobic papers. Thus, it is desirable to formulate a dye that is soluble in organic-based vehicles but leads to greater durability properties (such as waterfastness, smearfastness and smudgefastness) when printed on either hydrophilic media (plain paper) or hydrophobic media (coated offset media).

SUMMARY OF THE INVENTION

In one aspect, the invention is a dye for ink-jet printing. The dye includes a chromophore, a counterion which includes a first interaction enhancer and is ionically linked to the chromophore, and a second interaction enhancer covalently linked to the chromophore. Either the first interaction enhancer or the second interaction enhancer includes a hydrophilic moiety, while the other is a hydrophobic moiety. In another aspect, the invention is a method of increasing the interaction of an ionic dye with a substrate. The method includes associating a first counterion with the ionic dye. The first counterion comprises a hydrophilic moiety or a hydrophobic moiety. A second counterion may also be associated with the ionic dye. The second counterion may include the hydrophilic moiety or a hydrophobic moiety. In another aspect, the invention is a method of increasing the interaction of a dye with a substrate. The method includes covalently attaching a hydrophilic moiety, a hydrophobic moiety, or both, to the dye.

BRIEF DESCRIPTION OF THE DRAWING

The invention is described with reference to the several figures of the drawing, in which.

DETAILED DESCRIPTION

The invention provides a method for reducing the number of inks needed to obtain high durability prints on a wide variety of media types. By including a hydrophilic interaction enhancer in the counterion and a hydrophobic interaction enhancer in the dye (or vice versa), good durability can be obtained on plain paper (hydrophilic type media) or coated offset paper (hydrophobic media). Where plain paper is used, the hydrophilic portion of the dye (whether incorporated in the chromophore or the counterion) interacts strongly with the media through the formation of hydrogen bonds. Where coated paper (typically hydrophobic in nature) is used, the hydrophobic portion of the dye interacts strongly through $\pi$—$\pi$ interactions or van der Waals interactions, thereby increasing the durability of the resultant print.

This invention also provides a method of improving the decap performance of the ink-jet pen when using high (organic) content organic-based vehicles. This may be accomplished by increasing the solubility of the resultant dye through manipulation of the counterion, thereby reducing deposits near the print head nozzle during ink drop formation and ejection.

Figure 1A:
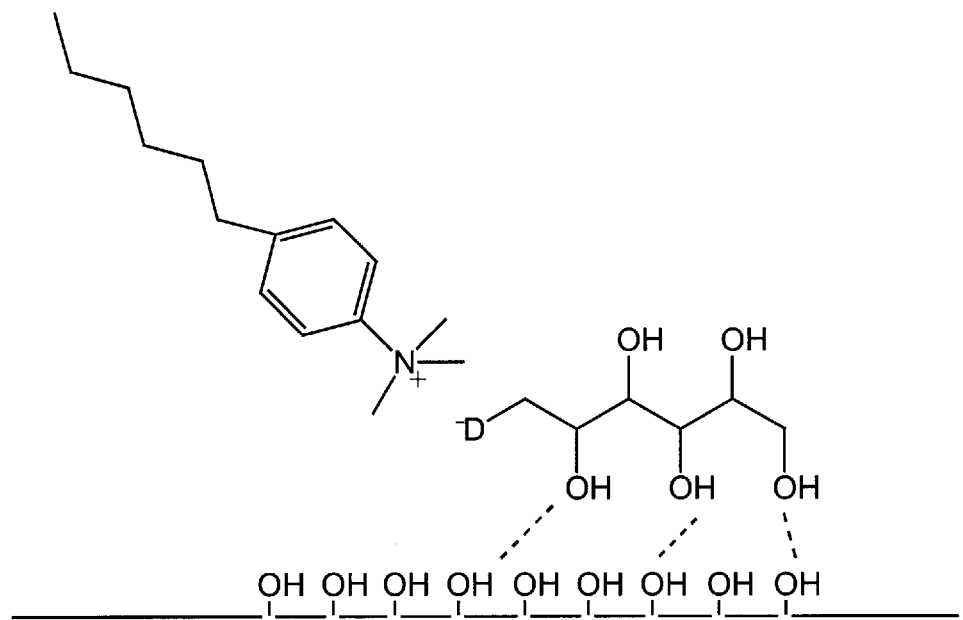
FIG. 1 is a schematic of representative dye-counterion interactions with (A) hydrophilic and (B) hydrophobic media.
Figure 1B:
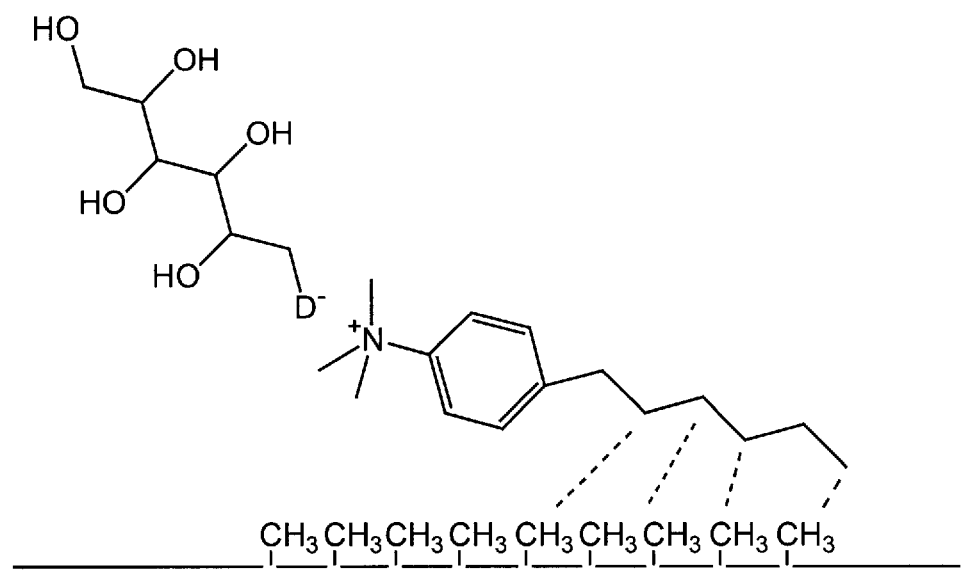

The invention exploits chemical interactions between a dye and the surface of a printed substrate (e.g.; paper) to increase the affinity between the dye and the substrate. For example, hydroxy dyes interact very well with plain paper due to hydrogen bond formation with the hydrophilic paper; however, they do not interact well with coated offset media, which are typically coated with hydrophobic materials such as butadiene-styrene polymers. Use of hydrophobic derivatives or counterions enhances the interaction of these dyes with hydrophobic papers, but does not significantly enhance print stability on plain paper media. However, by combining these two chemical groups (i.e., a hydrophobic dye with a hydrophilic counterion or a hydrophilic dye with a hydrophobic counterion) interaction with either the plain paper media or the hydrophobic offset media can be obtained (FIG. 1).

High molecular weight dyes, typically dimers and trimers of the parent dyes, exhibit increased waterfastness on hydrophobic media with respect to hydroxy dyes, presumably because the number of anionic interaction sites has increased, allowing increased interaction with a cationic underprinting fluid (e.g., protonated polyethyleneimine, or PEI). However, they do not exhibit strong interactions with printed media, decreasing their resistance to physical abrasion effects. Addition of hydrophobic groups or the use of hydrophobic counterions increases the mechanical stability of these dyes when printed on hydrophobic media.

Hydrophobic dyes demonstrate good waterfastness and good smudgefastness when printed on hydrophobic media. Typically, when good waterfastness is obtained, physical abrasion resistance (smudgefastness and smearfastness) suffers. This is because the dye "precipitates" towards the surface of the media, making it more susceptible to physical abrasion. However, hydrophobic dyes exhibit an increased interaction with the media, reducing their susceptibility towards physical abrasion. Ionic dyes are very soluble in water and thus have low waterfastness. Hydrophilic and hydrophobic derivatives can enhance the interactions of these dyes with both plain papers and coated offset media. In addition, instead of using counterions such as $Na^+$ or $Li^+$, a counterion may also be selected that will enhance the solubility of the dye in an organic-based vehicle or increase its interaction with the print media. For example, a glucosamine countercation may be coupled with a negatively charged hydrophobically modified dye. Reduced glucose may be linked to other charged moieties as well. Alternatively, gluconate may be used as a counteranion for positively charged hydrophobic dyes.

Figure 2:
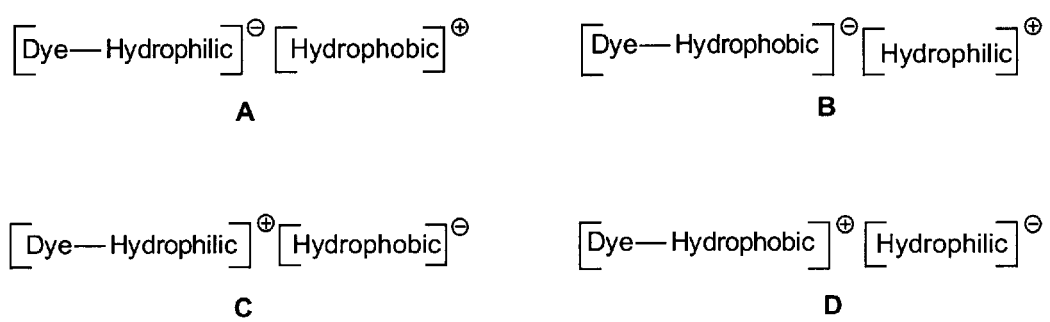
FIG. 2 is a schematic of representative dye-counterion interactions: (A) hydrophilic anionic dye with hydrophobic countercation, (B) hydrophobic anionic dye with hydrophilic countercation, (C) hydrophilic cationic dye with hydrophobic counteranion, and (D) hydrophobic cationic dye with hydrophilic counteranion.

Thus, a dye that has either a hydrophobic or hydrophilic group covalently attached to it will interact well with one sort of media (hydrophobic dyes with coated offset media, hydrophilic dyes with plain paper). However, by using a counterion having a contrasting composition (e.g., using a hydrophilic counterion with a hydrophobic dye or a hydrophobic counterion with a hydrophilic dye), the dye's interaction with both coated offset and plain paper may be increased (FIG. 2). Exemplary hydrophobic counterions include the following:

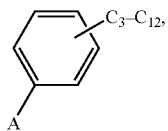

where A is $R_3N^+$, $CO_2^-$, or $SO_3^-$ and R is a straight chain having 1–3 carbons. Exemplary hydrophilic counterions include the following:

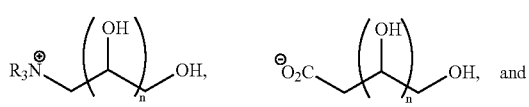

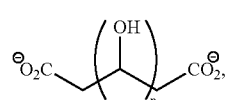

where R is straight chain having 1–3 carbons and n=3–500.

A variety of dyes can be adapted for use with this invention. Commercially available dyes may be modified with either hydrophobic or hydrophilic functionalities and then subjected to ion exchange to provide the desired counterion to enhance their interactions with the print media and ink vehicle. Suitable dyes may be obtained from such companies as Avecia, Tricon Colors, Clariant Corporation, Akzo Nobel, PMC Specialties Group, Inc., BASF Corporation, Ciba Specialty Chemicals Color Division, Sun Chemical Corporation, and Toyo Color America. In addition to choosing hydrophilic or hydrophobic counterions, dyes may be synthesized using the desired components, followed by ion exchange to produce a dye-counterion pair. The syntheses should be performed in such a manner as to not alter the π-orbital system of the dye, which might alter its color. In one embodiment, a hydrophilic or hydrophobic moiety, for example, glucose or hexylphenyl is attached to the dye. An additional atom such as nitrogen might be used to link the additional group to the dye, or the synthesis of the dye may be modified to incorporate the desired functional group. A typical hydrophilic dye structure, including a polyol, and a typical hydrophobic dye structure are as follows:

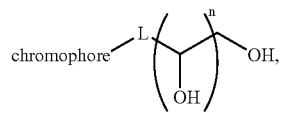

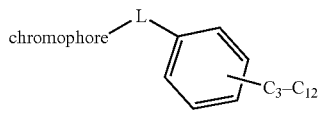

where L is any of the following:

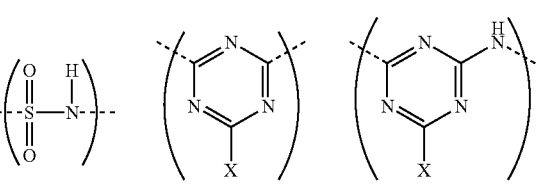

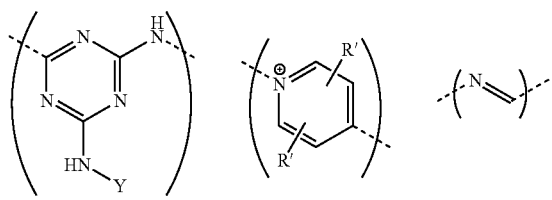

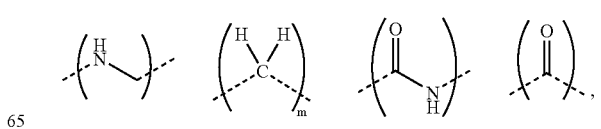

X is any of —Cl, —OH, —N=CH—R', —NH—CH$_2$—R', —NR'$_2$, or a chromophore, Y is any of

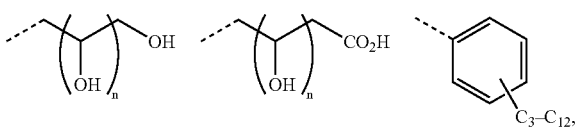

and R'=H, a straight alkl chain having 1–4 carbons, or a branched alkyl chain having 3–4 carbons. The chromophore is used to impart color to the dye and may include sulfonates, carboxylates, ammonium ions or any combination of these.

Other ingredients such as surfactants, buffers, humectants, and anti-cockle reagents may also be employed in the practice of the invention. Because the invention exploits the interaction of the counterion with the chemically modified dye through ionic interactions, suitable surfactants are typically non-ionic in nature to reduce exchange interactions of the surfactants with either the chemically-modified chromophore or the counterion. Examples of suitable non-ionic surfactants include secondary alcohol ethoxylates (e.g., Tergitol series available from Union Carbide Co.), non-ionic fluoro surfactants (such as Fluorad FC-170C available from 3M), non-ionic fatty acid ethoxylate surfactants (e.g., Alkamul PSMO-20 available from Rhone-Poulenc), fatty amide ethoxylate surfactants (e.g., Aldamide L-203 available from Rhone-Poulenc), ethoxylated silicone surfactants (such as Silwett L-7607 available from Witco) and acetylenic polyethylene oxide surfactants (e.g., Surfynol 465, available from Air Products & Chemicals, Inc.).

Buffers may be used to modulate pH. Both organic-based biological buffers and inorganic buffers such as sodium phosphate are appropriate for use with the invention. Furthermore, the buffer employed should provide a ink pH ranging from about 4 to about 9, prefereably from about 6 to about 8. Exemplary organic buffers include Trizma base, 4-morpholinoethane sulfonic acid (MES), and 4-morpholinepropanesulfonic acid (MOPS), available from companies such as Aldrich Chemical (Milwaukee, Wis.).

Any of the biocides commonly employed in ink-jet inks may be employed in the practice of the invention, such as NUOSEPT 95, available from Hals America (Piscataway, N.J.), Proxel GXL, available from Avecia (Wilmington, Del.), and glutaraldehyde, available from Union Carbide Company (Bound Brook, N.J.) under the trade designation UCARCIDE 250. Proxel GXL is a preferred biocide.

The inks of the present invention comprise from about 1 to about 40 wt % of at least one organic solvent. More preferably, the inks comprise from about 10 to about 30 wt % of at least one organic solvent and, most preferably, from about 15 to 30 wt % of at least one organic solvent. Organic solvents are used as both humectants and as anti-cockle reagents. Solvents suitable for use in the inventive ink-jet ink compositions include any of, or a mixture of two or more of, nitrogen containing heterocyclic ketones such as 2-pyrrolidinone, N-methyl-2-pyrrolidinone (NMP), 1,3-dimethylimidazolid-2-one, and octyl-pyrrolidinone; diols such as ethanediols, (e.g., 1,2-ethanediol), propanediols (e.g., 1,2-propanediol, 1,3-propanediol, 2-ethyl-2-hydroxy-1,3-propanediol, ethylhydroxy-propanediol (EHPD)), butanediols (e.g., 1,2-butanediol, 1,3-butanediol, 1,4-butanediol), pentanediols (e.g., 1,5-pentanediol), hexanediols (e.g., 1,2-hexanediol, 1,2-hexanediol, 2,5-hexanediol), heptanediols (e.g., 1,2-heptanediol, 1,7-heptanediol), octanediols (e.g., 1,2-octanediol, 1,8-octanediol); and glycol ethers and thioglycol ethers commonly employed in ink-jet inks, including polyalkylene glycols such as polyethylene glycols (e.g., diethylene glycol (DEG), triethylene glycol, tetraethylene glycol), polypropylene glycols (e.g., dipropylene glycol, tripropylene glycol, tetrapropylene glycol), polymeric glycols (e.g., PEG 200, PEG 300, PEG 400, PPG 400), and thiodiglycol. Additionally, ethers of the various glycols, such as n-butyl carbitol, propylene glycol n-propyl ether, and phenyl carbitol, may also be used. One skilled in the art will recognize that there are many more nitrogenated heterocyclic ketones, diols, glycols, and glycol ethers besides those listed above. Such solvents are appropriate for use with the invention but tend to be more expensive.

The tables below give compositions for exemplary dyes prepared according to the invention.

TABLE 1

Ink with hydrophilic dye and hydrophobic counterion

| Component | Wt % |
|---|---|
| Propylene glycol propylene ether | 15.0 |
| 2-pyrrolidinone | 7.5 |
| 1,2-hexanediol | 5.0 |
| Silwet L-7607 | 1.0 |
| Colorant | 5.0 |
| Water | balance |

TABLE 2

Ink with hydrophobic dye and hydrophilic counterion

| Component | Wt % |
|---|---|
| Propylene glycol propylene ether | 10.0 |
| 1,6-hexanediol | 10.0 |
| N-methyldiethanolamine | 10.0 |
| Fluorad FC-170C | 1.5 |
| Colorant | 5.0 |
| Water | balance |

The following examples provide, via retro-chemical synthesis, a sampling of the chemistries that may be employed to adapt commercially available dyes for use with the instant invention (S. Warren, *Organic Synthesis: The Disconnection Approach*, Chichester, England: John Wiley & Sons, 1982). The following molecules and reactions are merely exemplary. One skilled in the art will recognize that the chemistries described below may be adapted to a variety of different dyes.

EXAMPLES

Example 1

Black Hydrophilic Anionic Dye

This dye was based on the commercially available C.I. (color index) Acid Black 200 dye. Upon addition of the amine functionality to the carbonyl group of D-glucose and reduction in situ, for example, with a cyanoborohydride, the desired dye was obtained (U.S. Pat. No. 6,221,139, issued Apr. 24, 2001; Borch, et al., *J. Am,. Chem. Soc.*, 93: 2897 (1971); Boutique, et al., *Bull. Soc. Chim. Fr.* 2: 750 (1973); *Lane Synthesis*, 135 (March, 1975)).

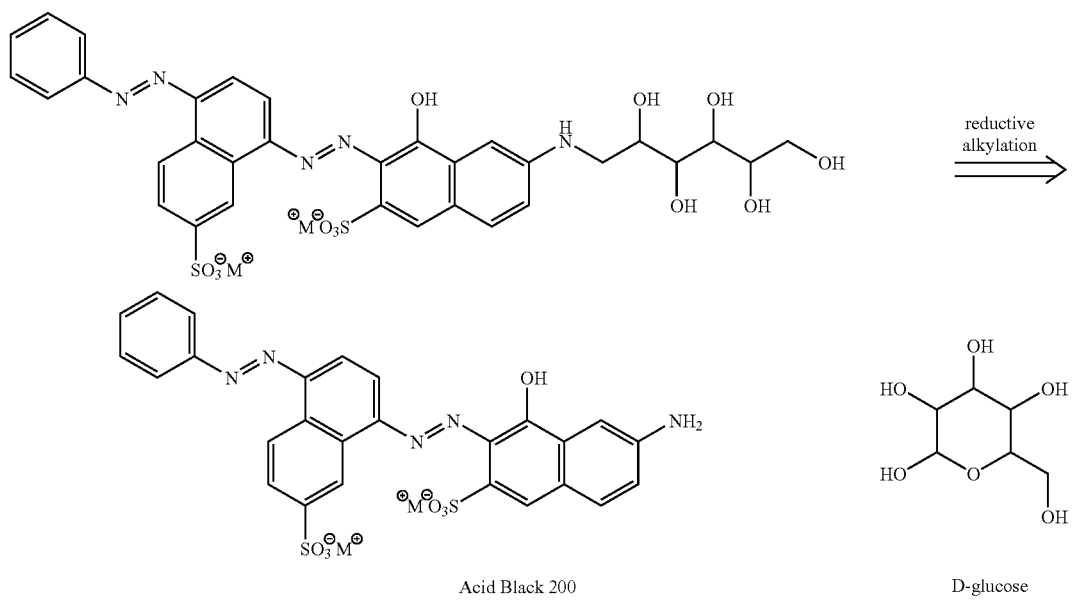

Acid Black 200

D-glucose

Example 2

Black Hydrophobic Anionic Dye

This dye is based on the commercially available C.I. Acid Black 200 dye but is synthesized with different substituents to give it the desired characteristics. Starting with 6-amino-4-hydroxy-2-naphthalenesulfonic acid, an alkylation was performed to add one hydrophobic group to the molecule. After this is performed, two diazotizations are necessary to complete the chromophore for the black dye as well as to add one more hydrophobic group (see D. L. Pavia, et al., *Introduction to Organic Laboratory Techniques*, 2$^{nd}$ Ed., Philadelphia, Pa.: Saunders College Publishing, 1982, pp. 245–253; Gregory, et al. in *The Chemistry and Application of Dyes*, Ed. Waring, et al., New York, N.Y.: Plenum Press, 1994, Chapters 2 and 6; U.S. Pat. Nos. 4,514,226, issued Apr. 30, 1985, 4,725,675, issued Feb. 16, 1988, 4,767,844, issued Aug. 30, 1988, and 4,189,427, issued Feb. 2, 1980).

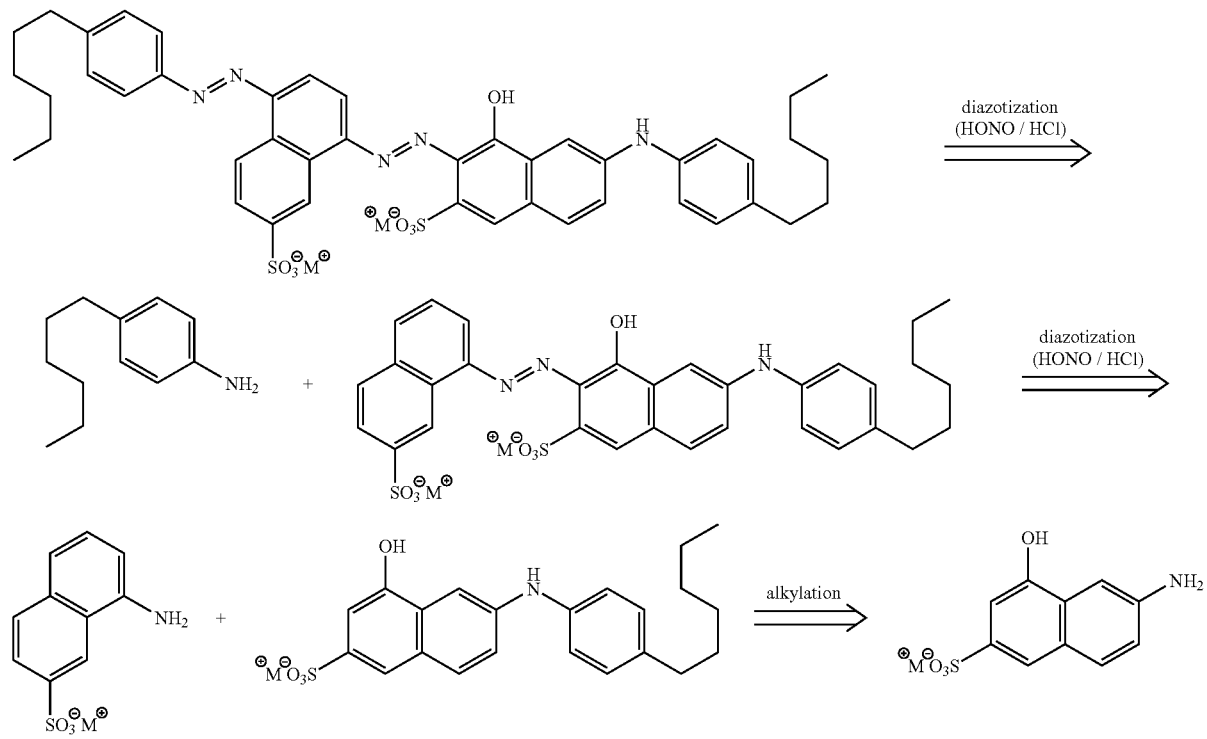

Example 3

Black Hydrophilic Cationic Dye

Starting with N,N-dimethylaniline and p-nitroaniline, a diazo coupling is performed followed by alkylation of the dimethylaniline portion of the molecule to make a cationic version of this black dye. Reduction of the nitro group followed by a reductive alkylation results in the final hydrophilic cationic dye (Augustine, *Catalytic Hydrogenation*, New York, N.Y.: Marcel Dekker, 1965, Chapter 5; Freifelder, *Practical Catalytic Hydrogenation*, New York, N.Y.: Wiley Interscience, 1971, Chapter 10; Rylander, *Hydrogenation Methods*, New York, N.Y.: Academic Press, 1985, Chapter 8).

Example 4

Black Hydrophobic Cationic Dye

An example of such a dye may be made by the addition of the corresponding pyridine derivative to C.I. Acid Black 180. The methyl groups in the 2,6-positions rotate the pyridine ring out of the plane of the chromophore (Schut, et al., *New J. Chem.* 20(1): 113 (1996)). This limits the interaction of the pyridine moiety with the π-orbital system of the chromophore and prevents modification of the color of the dye.

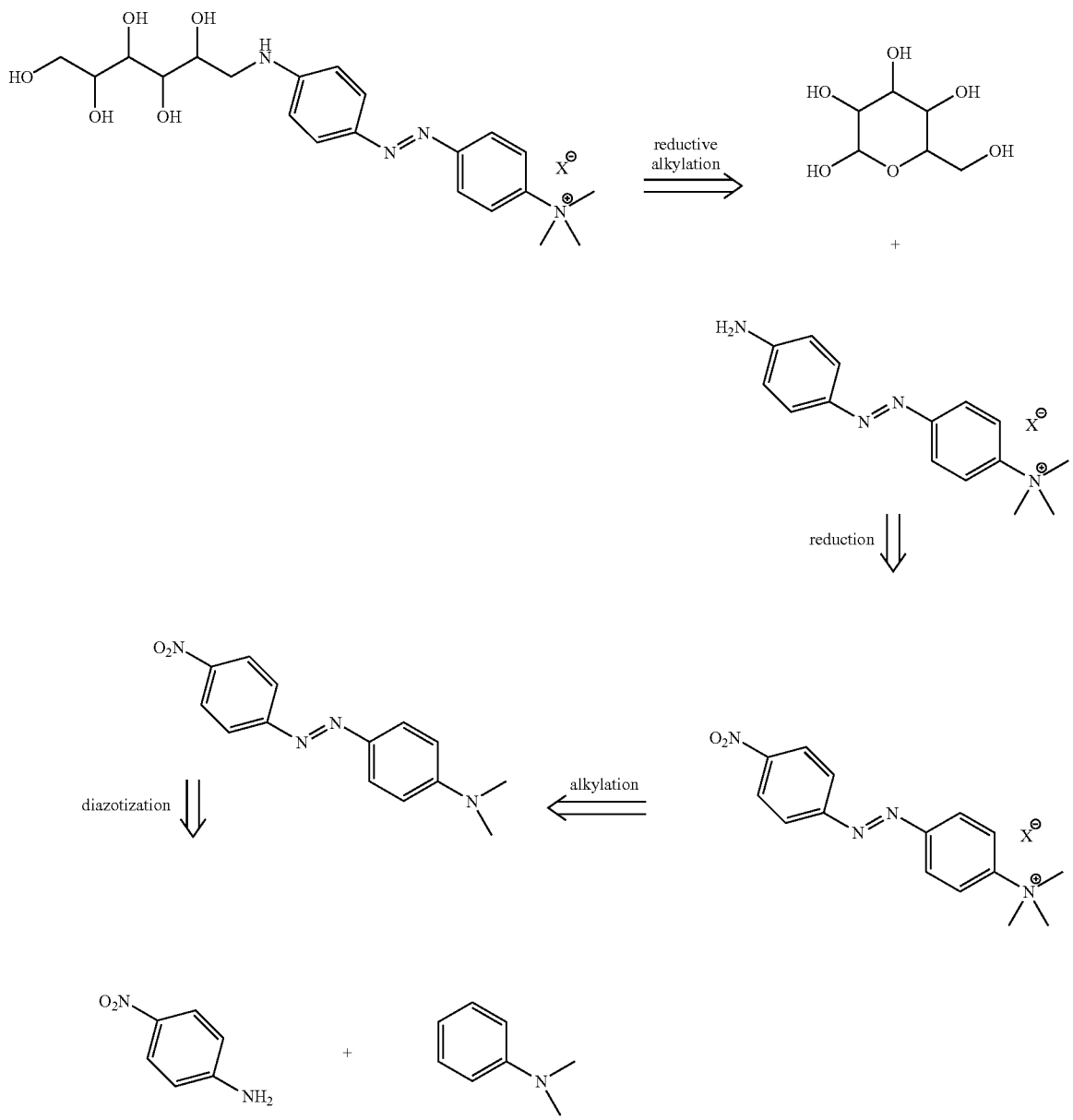

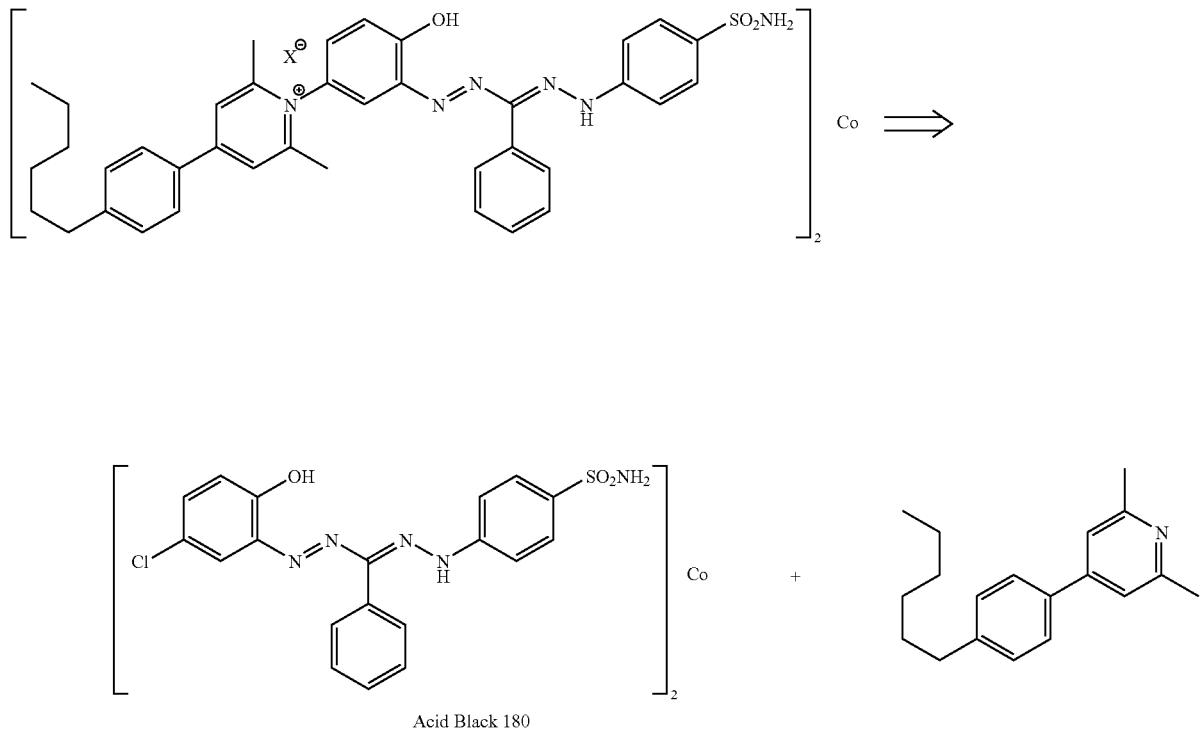

Acid Black 180

Example 5a

Cyan Hydrophilic Anionic Dye

This dye is made as disclosed in U.S. Pat. No. 5,102,459, issued Apr. 7, 1992. The tetrasulfonic acid may be produced by sulfochlorination of copper phthalocyanine, followed by reduction of the sulfochloride to the sulfinic acid salt. D-glucosamine is attached to the sulfate groups on copper phthalocyanine tetrasulfonic acid. The ratio of sulfonate:D-glucosamine is variable and is highly dependent upon the conditions of the reaction as well as the equivalents of each reactant added. The position of substitution is also variable; the structure below is merely one example of several possible structures.

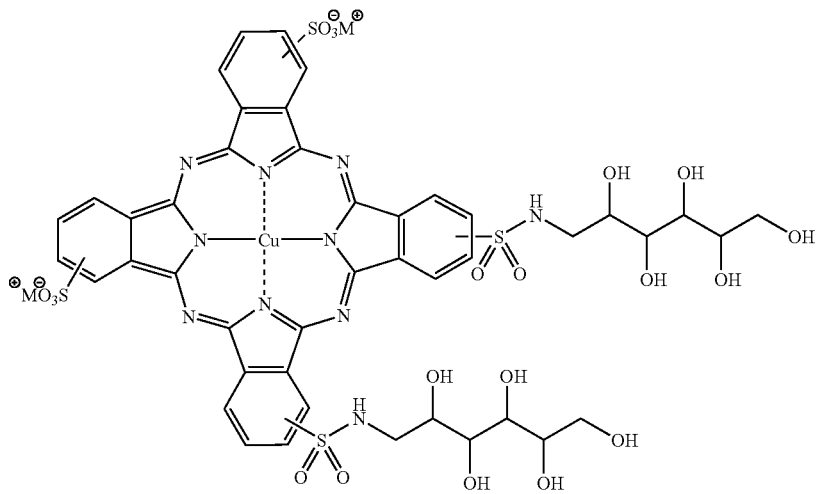

Example 5b

Cyan Hydrophilic Anionic Dye

The following dye was produced by attaching D-glucose to the primary amino of C.I. Acid Blue 25 (a commercially available dye) via a reductive alkylation reaction.

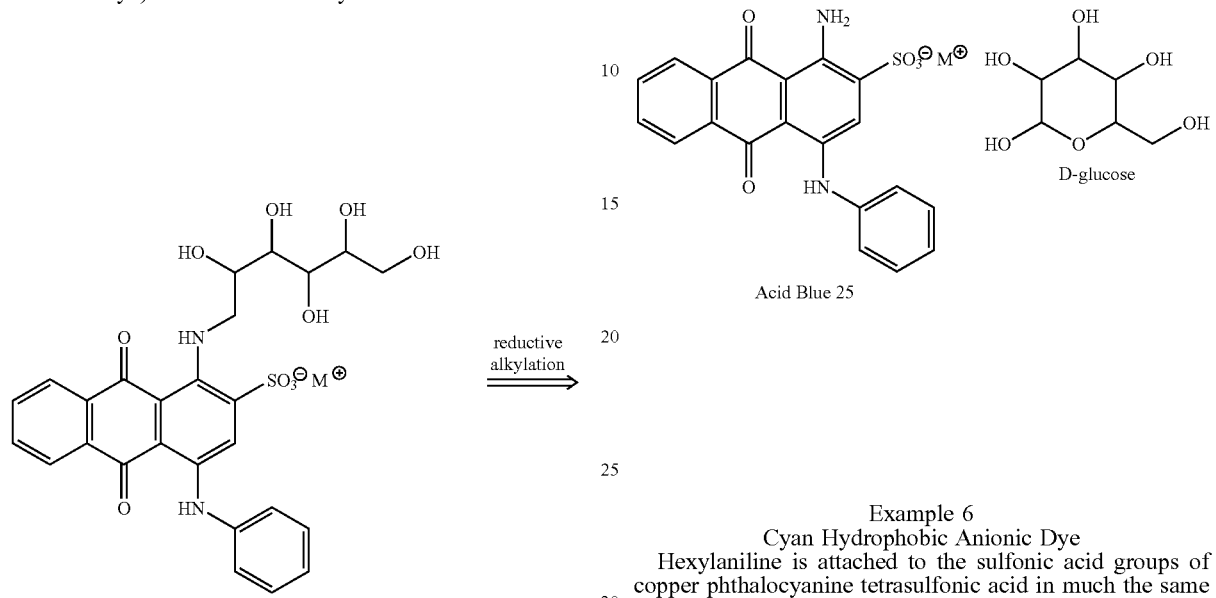

Acid Blue 25

Example 6
Cyan Hydrophobic Anionic Dye

Hexylaniline is attached to the sulfonic acid groups of copper phthalocyanine tetrasulfonic acid in much the same manner as D-glucosamine in Example 5a. The ratio of sulfonate:p-hexylaniline is variable and is highly dependent upon the conditions of the reaction as well as the equivalents of each reactant added. The position of substitution is also variable; the structure below is merely one example of several possible structures.

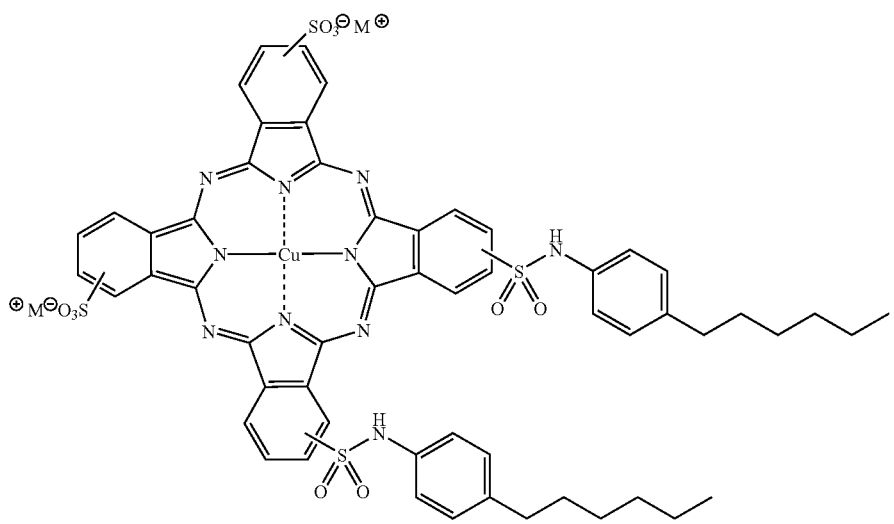

Example 7

Cyan Hydrophilic Cationic Dye

The dye produced in Example 5a is rendered cationic by attaching 1,2-diaminoethane on the remaining sulfonate groups using the same reaction described in Example 5a and Example 6, followed by methylation of the amine to produce the following cationic dye:

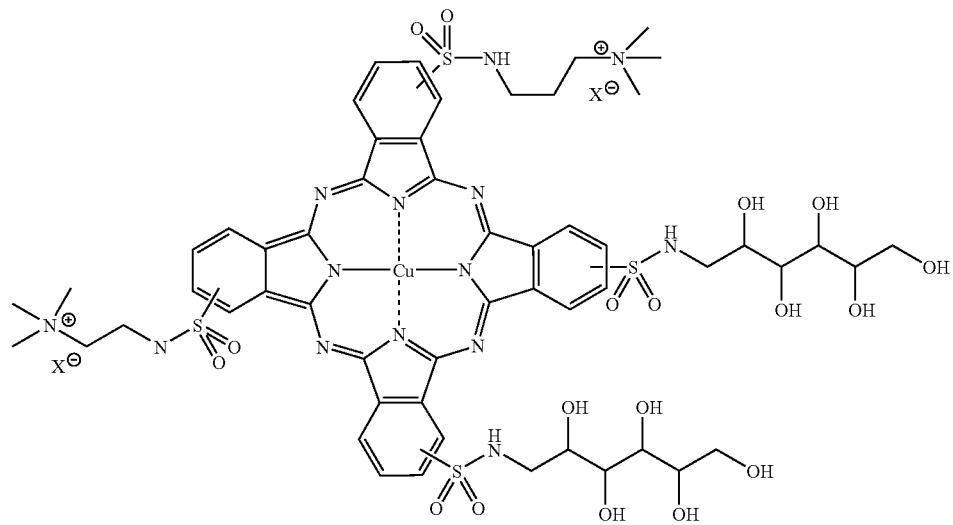

The ratio of ethyl-trimethylammonium:D-glucosamine is variable and is highly dependent upon the conditions of the reaction as well as the equivalents of each reactant added. The position of substitution is also variable; the above structure is merely one example of several possible structures.

Example 8

Cyan Hydrophobic Cationic Dye

The dye produced in Example 6 is rendered cationic by reacting 1,2-diaminoethane at the remaining sulfonate groups using the same reaction described in Example 5a and Example 6, followed by methylation of the amine to produce the following cationic dye:

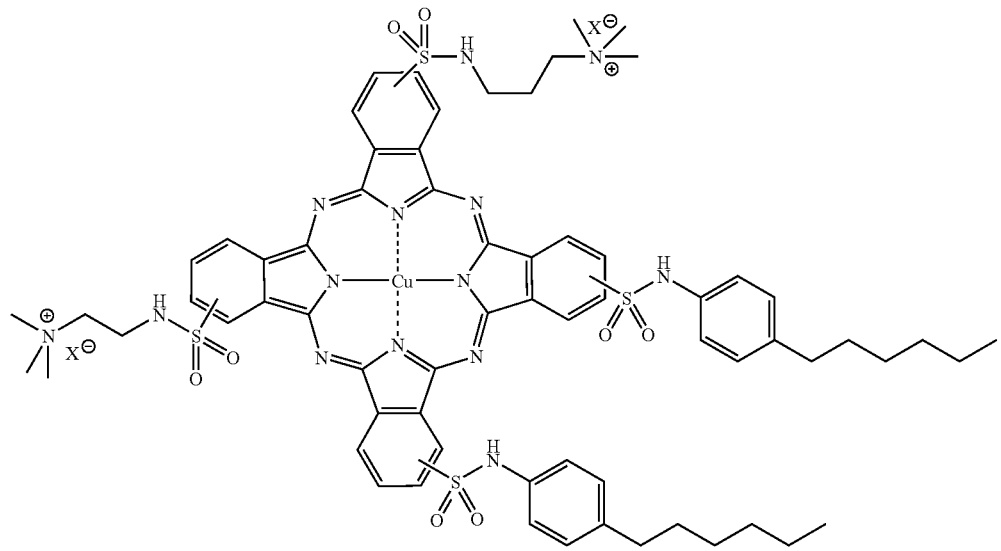

It should be noted that the ratio of ethyl-trimethylammonium:p-hexylaniline is variable and is highly dependent upon the conditions of the reaction as well as the equivalents of each reactant added. The position of substitution is also variable; the above structure is merely one example of several possible structures.

Example 9

Magenta Hydrophilic Anionic Dye

The dye was produced by attaching D-glucosamine to Reactive Red 2, for example, in a solution of hot water (as disclosed in European Patent Publication No. 899 310A, published Aug. 24, 1998, and U.S. Pat. No. 6,056,811, issued May 2, 2000) to produce the following:

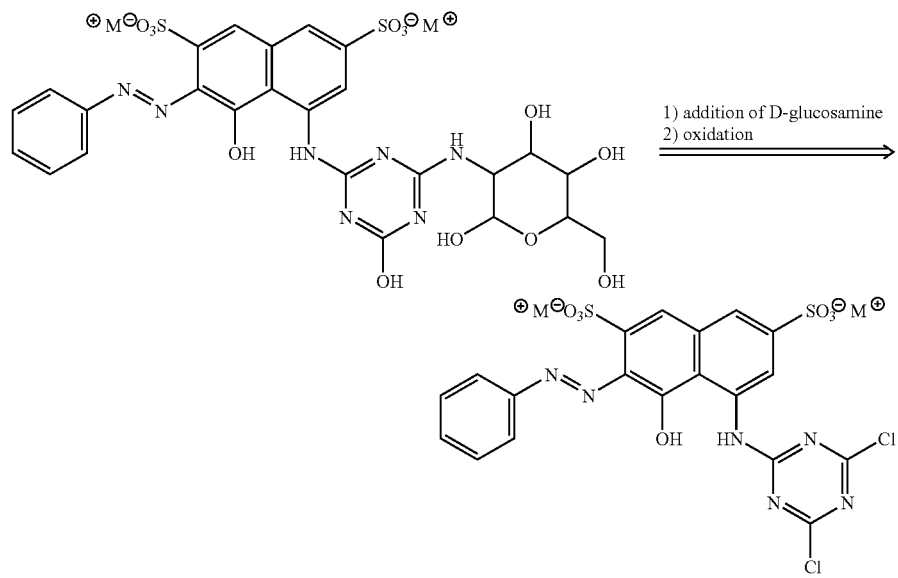

Reactive Red 2

Example 10

Magenta Hydrophobic Anionic Dye

This dye may be produced by reacting 4-amino-5-hydroxy-2,7-naphthalene disulfonic acid with cyanuric chloride. The cyanuric chloro-derivative is then coupled with p-hexylaniline via a diazo coupling to produce a reactive magenta dye. This reactive magenta dye is then functionalized through the reactive chlorines through addition of p-hexylaniline and water to produce the final product.

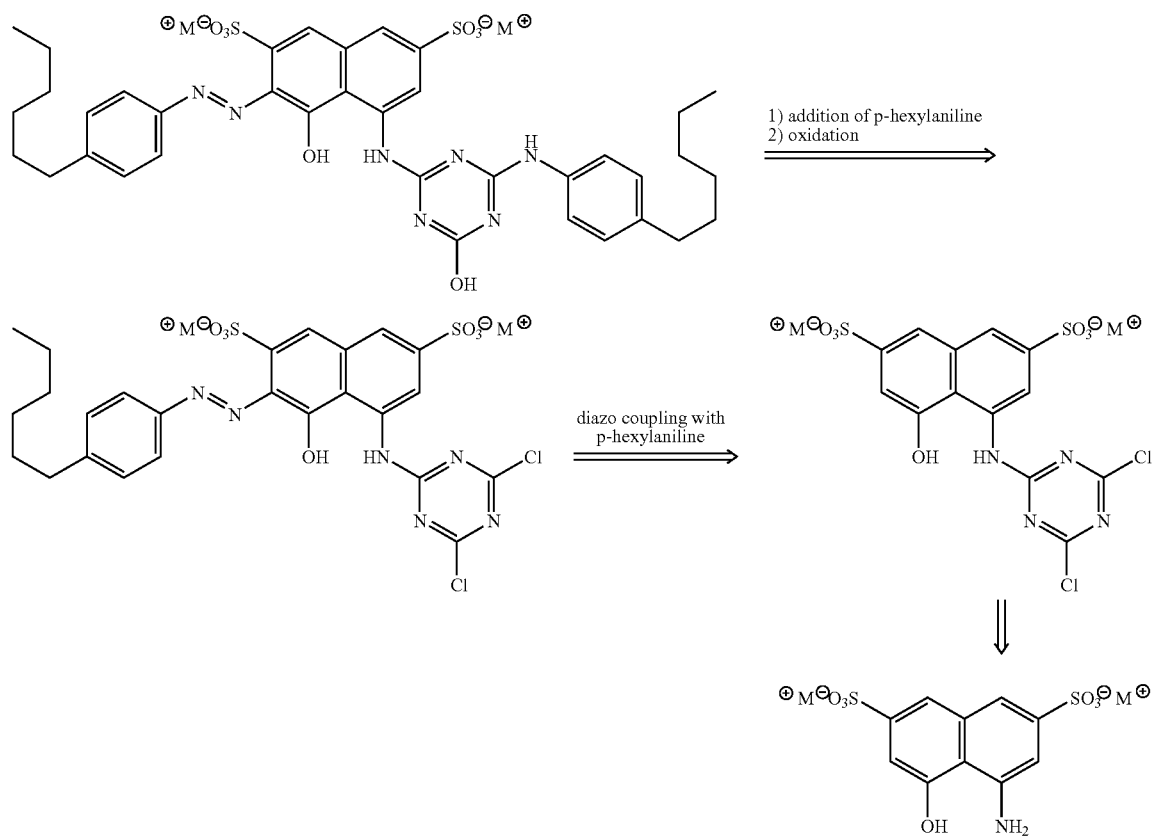

Example 11

Magenta Hydrophilic Cationic Dye

Reactive Red 2 was used as a precursor for this dye. Reaction of D-glucosamine (as described in Example 9), followed by reaction with pyridine produced the following cationic dye with the hydrophilic groups attached:

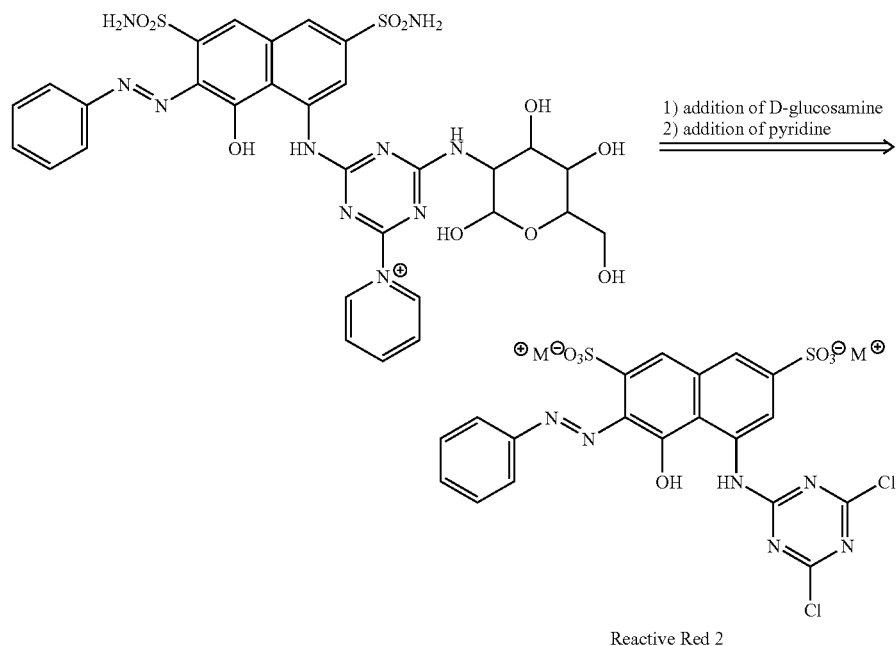

Reactive Red 2

Example 12

Magenta Hydrophobic Cationic Dye

By using the precursor to C.I. Acid Red 249, the following dye may be made by reacting the aniline portion of the molecule with the sulfonyl chloride of the hydrophobic portion of the future dye, followed by reaction with pyridine to give the magenta hydrophobic cationic dye (Walker in The *Chemistry and Application of Dyes*, Ed. Waring, et al., New York, N.Y.: Plenum Press, 1984, p. 233; Morrison, et al., *Organic Chemistry*, 4th Ed., Boston, Mass.: Allyn and Bacon, 1983, Chapter 23):

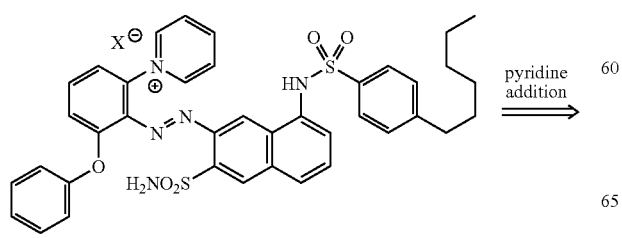

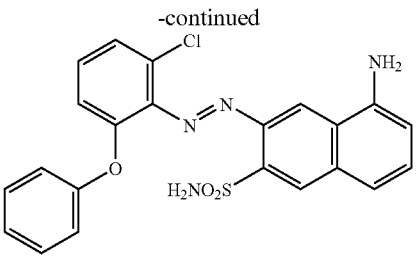

Acid Red 249 precursor

Example 13

Yellow Hydrophilic Anionic Dye

The following dye resulted from the reductive alkylation of D-glucose to the known dye C.I. Acid Yellow 66.

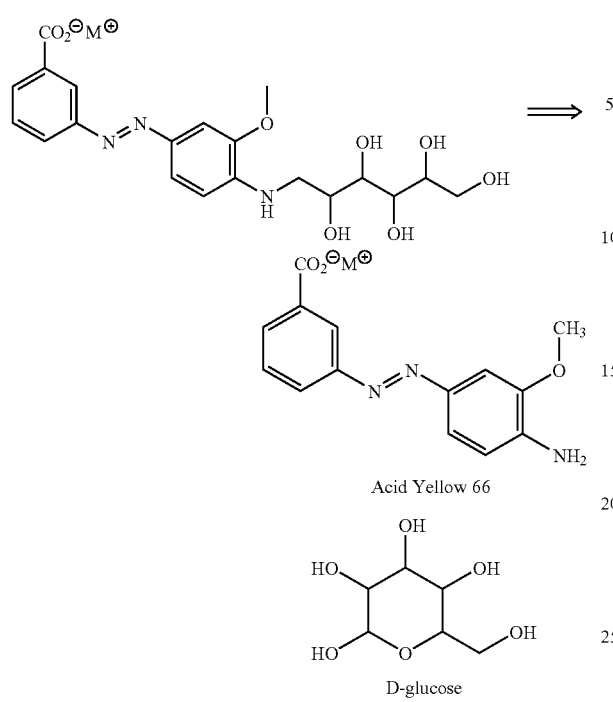

Acid Yellow 66

D-glucose

Example 14

Yellow Hydrophobic Anionic Dye

The sequence of steps to produce this dye starts with diazo coupling, followed by addition of cyanuric chloride to the aniline portion of the dye, followed by addition of p-hexylaniline and then addition of NaOH to oxidize the triazo ring (Waring in *The Chemistry and Application of Dyes*, Ed. Waring, et al., New York, N.Y.: Plenum Press, 1994, Chapter 3; U.S. Pat. Nos. 4,028,357, Jun. 7, 1977, and 4,725,675, issued Feb. 16, 1988).

Example 15

Yellow Hydrophilic Cationic Dye

The dye was produced through the reductive alkylation of the aniline portion of the starting material with D-glucose.

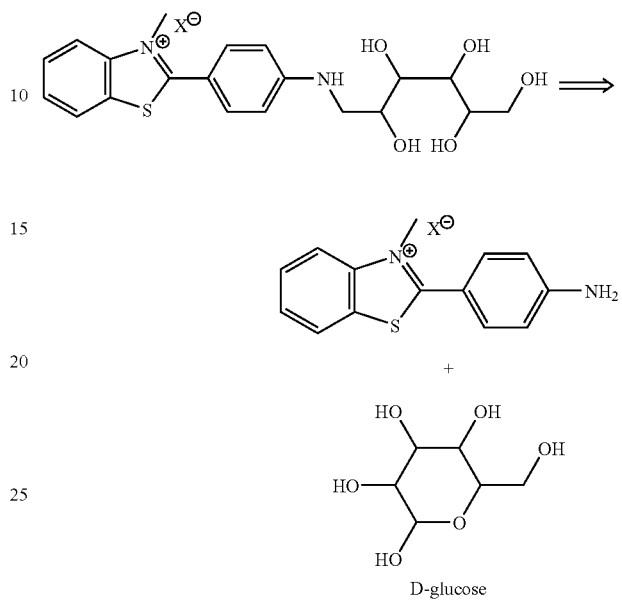

D-glucose

Example 16

Yellow Hydrophobic Cationic Dye p-Aminobenzaldehyde is reacted with p-chloromethyl hexylbenzene to form the first intermediate. This is then alkylated with 1-chloro-2-trimethylammonium ethane to form the second intermediate. Finally, an ylide addition reaction is performed to derive the final dye product (Lee, et al., *J. Org. Chem.*, 44: 719 (1979)).

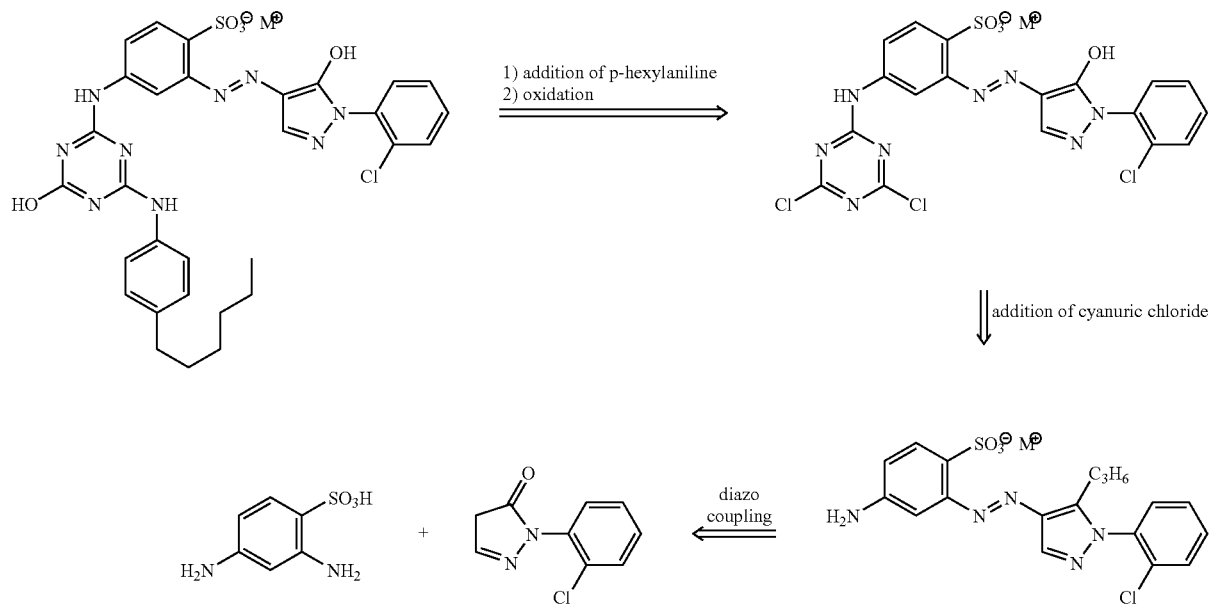

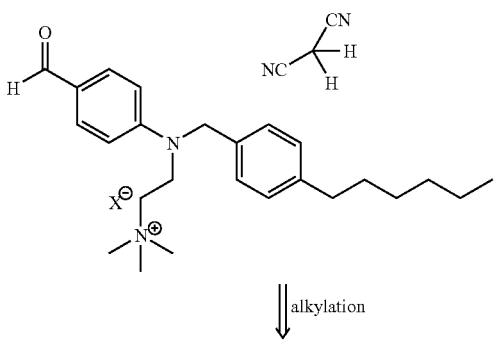
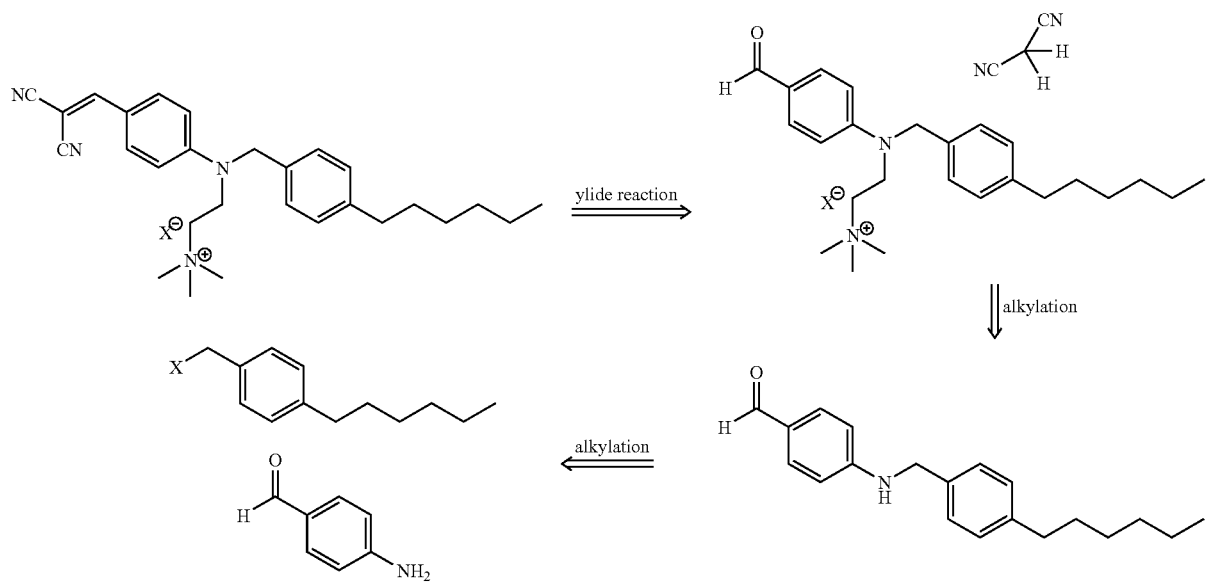

Example 17

Green Hydrophilic Anionic Dye

A reductive alkylation of D-glucose to acid green 12 produced the following dye:

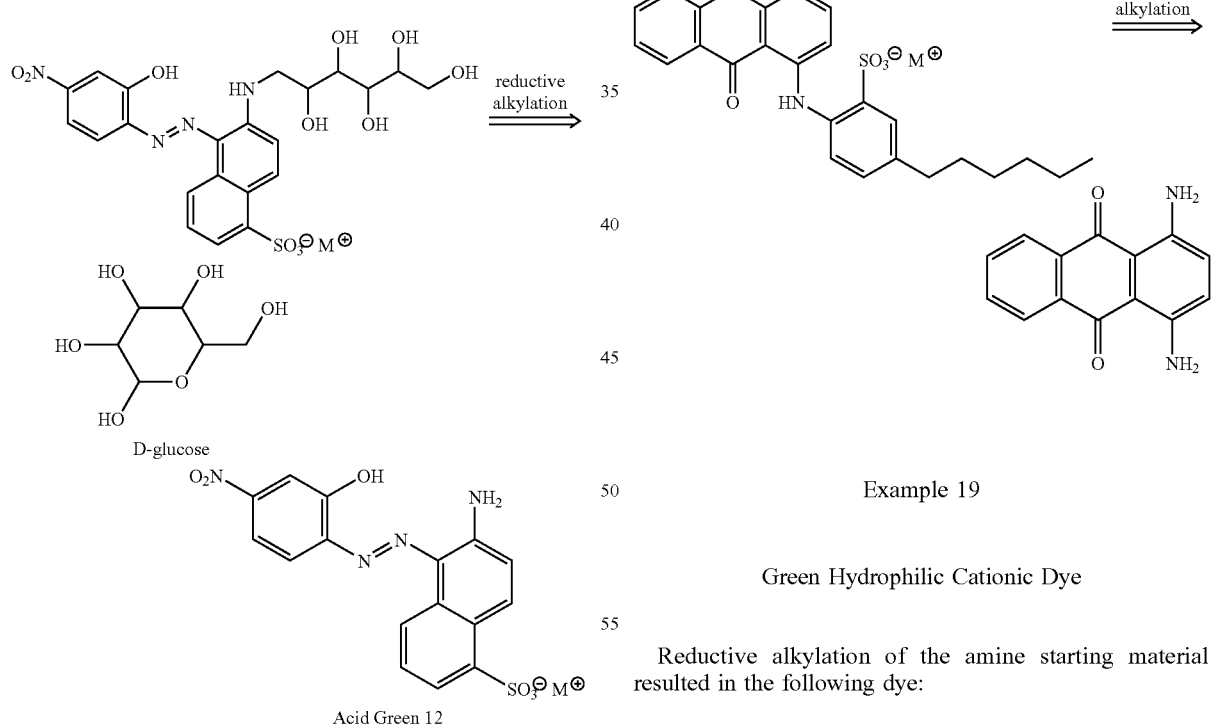

Example 18

Green Hydrophobic Anionic Dye

Synthesis of this dye occurs through the alkylation of the corresponding amine.

Example 19

Green Hydrophilic Cationic Dye

Reductive alkylation of the amine starting material resulted in the following dye:

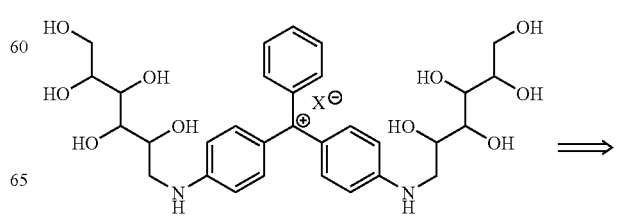

-continued
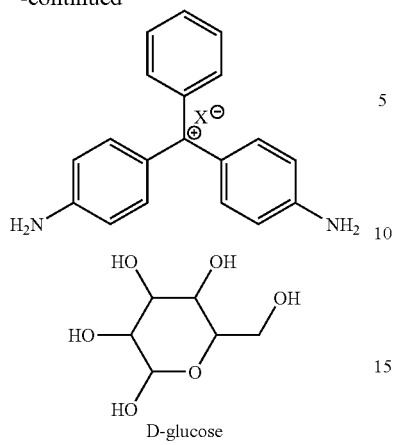
Example 20
Green Hydrophobic Cationic Dye
This dye is synthesized through the addition of pyridine and the desired hydrophobic component onto the reactive dye portion of the molecule (dichlorotriazene ring derivative). This is then followed by two separate diazo couplings to produce the desired dye.
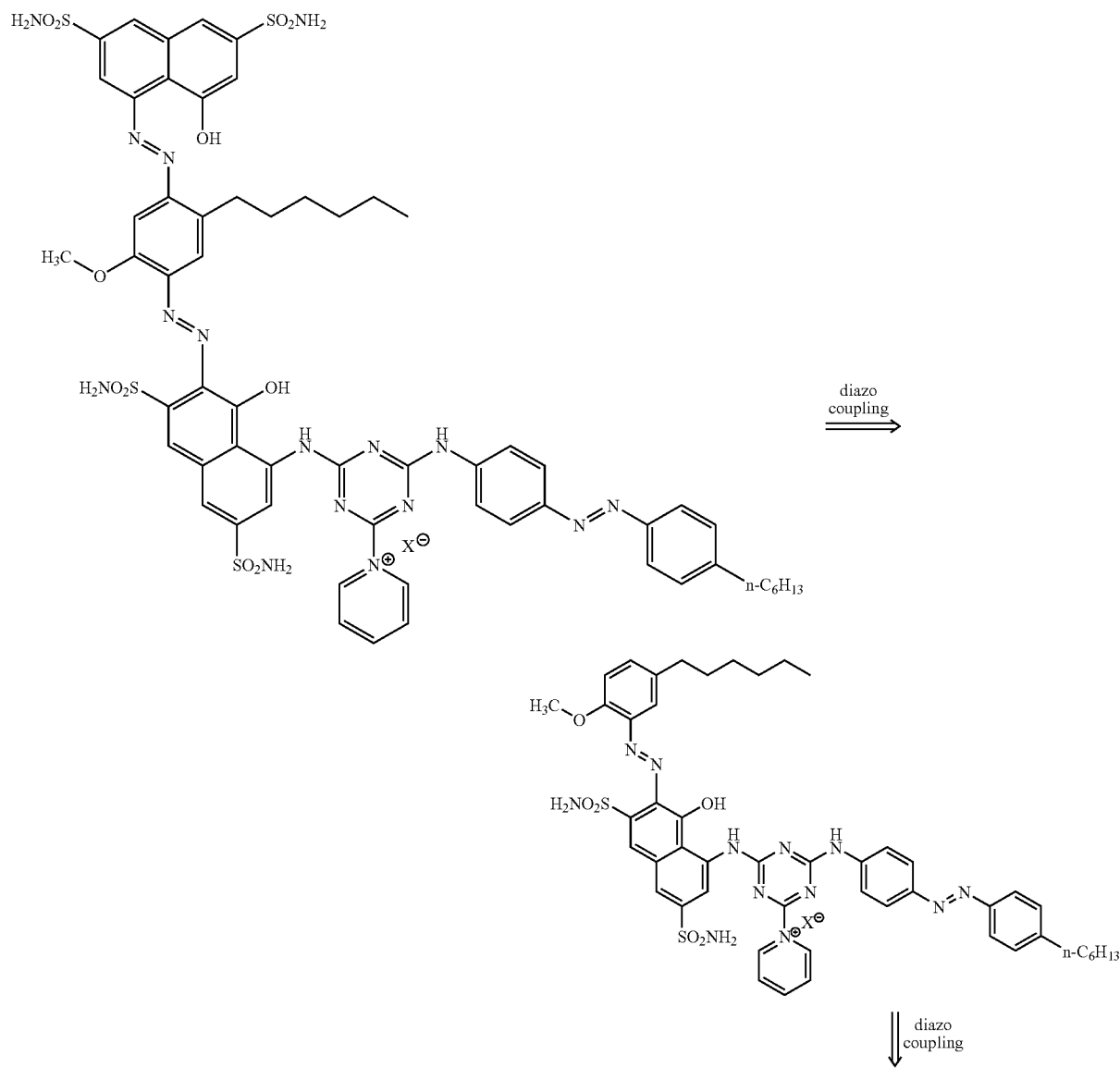

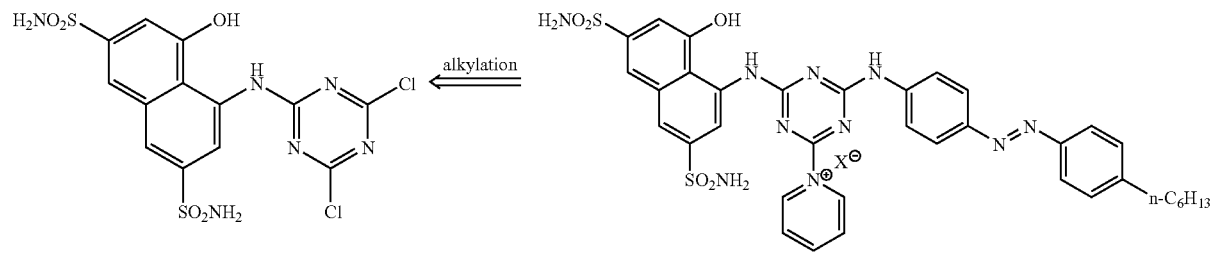
Example 21
Orange Hydrophilic Anionic Dye
This dye was made from the reductive alkylation of Cotton Orange G with D-glucose.
Example 22
Orange Hydrophobic Anionic Dye
The following dye is made from the diazo coupling of the starting materials.
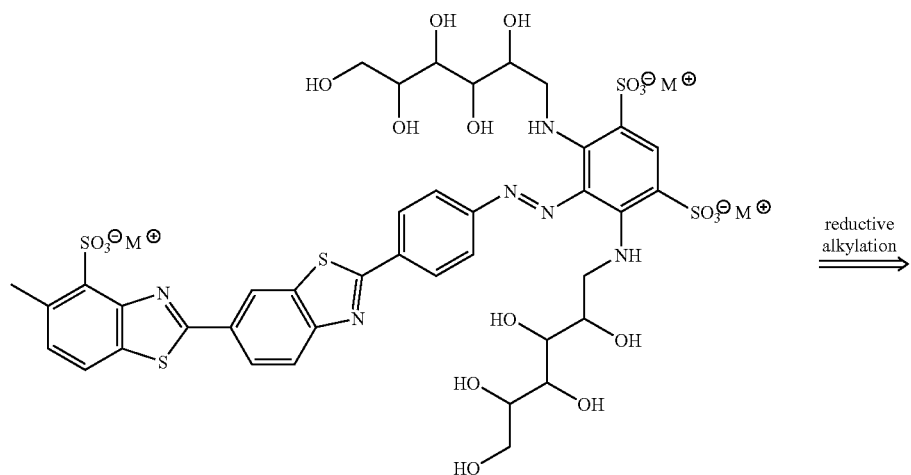
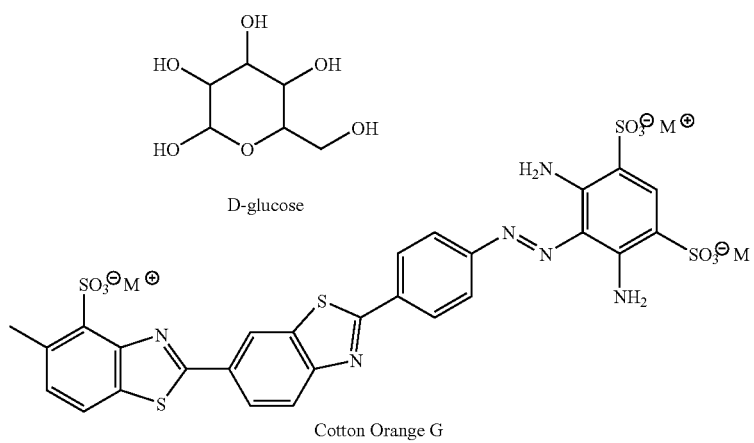
D-glucose
Cotton Orange G

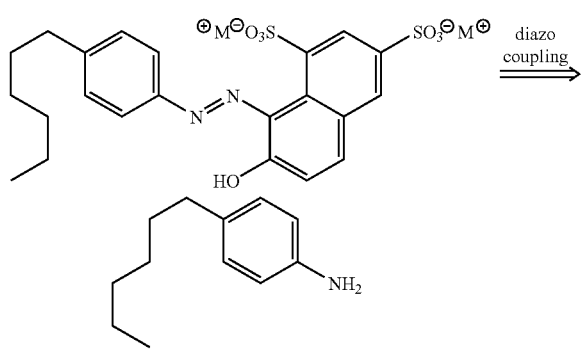

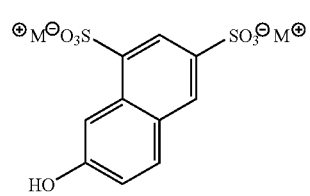

Example 23

Orange Hydrophilic Cationic Dye

Using C.I. Basic Orange 1 as the starting material, alkylation (after protection of the less hindered amine) of the amine to produce the cationic material followed by a reductive alkylation of the (now unprotected) amine gives the following dye structure:

Example 24a

Orange Hydrophobic Cationic Dye

A nonmetallized dye is made by substituting the pyridine derivative (containing the hydrophobic hexylphenyl group) onto the chromophore precursor to C.I. Acid Orange 100. Through further reaction with Co, for example, as an acetate hydrate, the metallized orange dye shown below is synthesized (U.S. Pat. No. 4,248,949, issued Feb. 3, 1981):

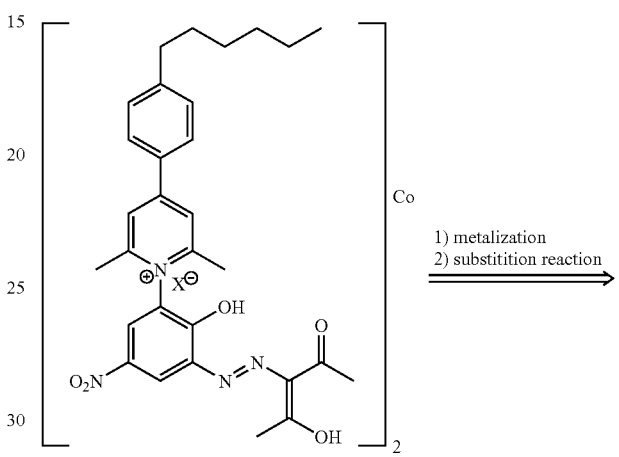

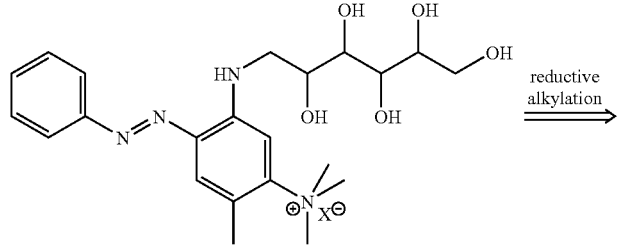

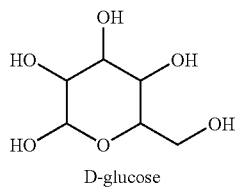

D-glucose

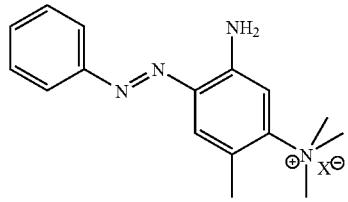

alkylation

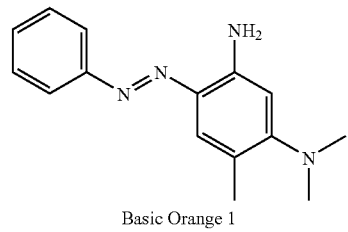

Basic Orange 1

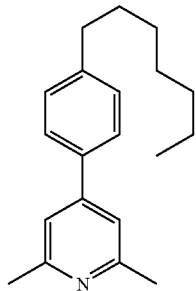
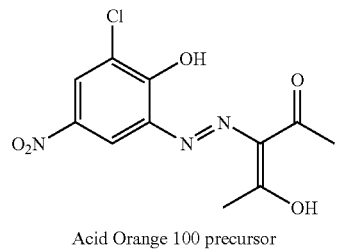

Acid Orange 100 precursor

Example 24b

Orange Hydrophobic Cationic Dye

This dye is produced through the diazotization of 2,5-dichloroaniline with ethyl phenyl amine. The amine is then further functionalized with a benzyl group. Finally, substitution of the two chlorines with the pyridine derivatives of the hydrophobic additive gives the final product.

Other embodiments of the invention will be apparent to those skilled in the art from a consideration of the specification or practice of the invention disclosed herein. It is intended that the specification and examples be considered as exemplary only, with the true scope of the invention being indicated by the following claims.

What is claimed is:

1. A dye for ink-jet printing, comprising:
   a chromophore;
   a counterion ionically linked to the chromophore, wherein the counterion comprises a first interaction enhancer; and
   a second interaction enhancer covalently linked to the chromophore, wherein
   one of the first interaction enhancer and the second interaction enhancer is a hydrophilic moiety, and
   one of the first interaction enhancer and the second interaction enhancer is a hydrophobic moiety.

2. The dye of claim 1, wherein the counterion comprises a charged nitrogen atom, sulfonate, or carboxylate.

3. The dye of claim 1, wherein the counterion comprises a member of the group consisting of gluconate, glucosamine,

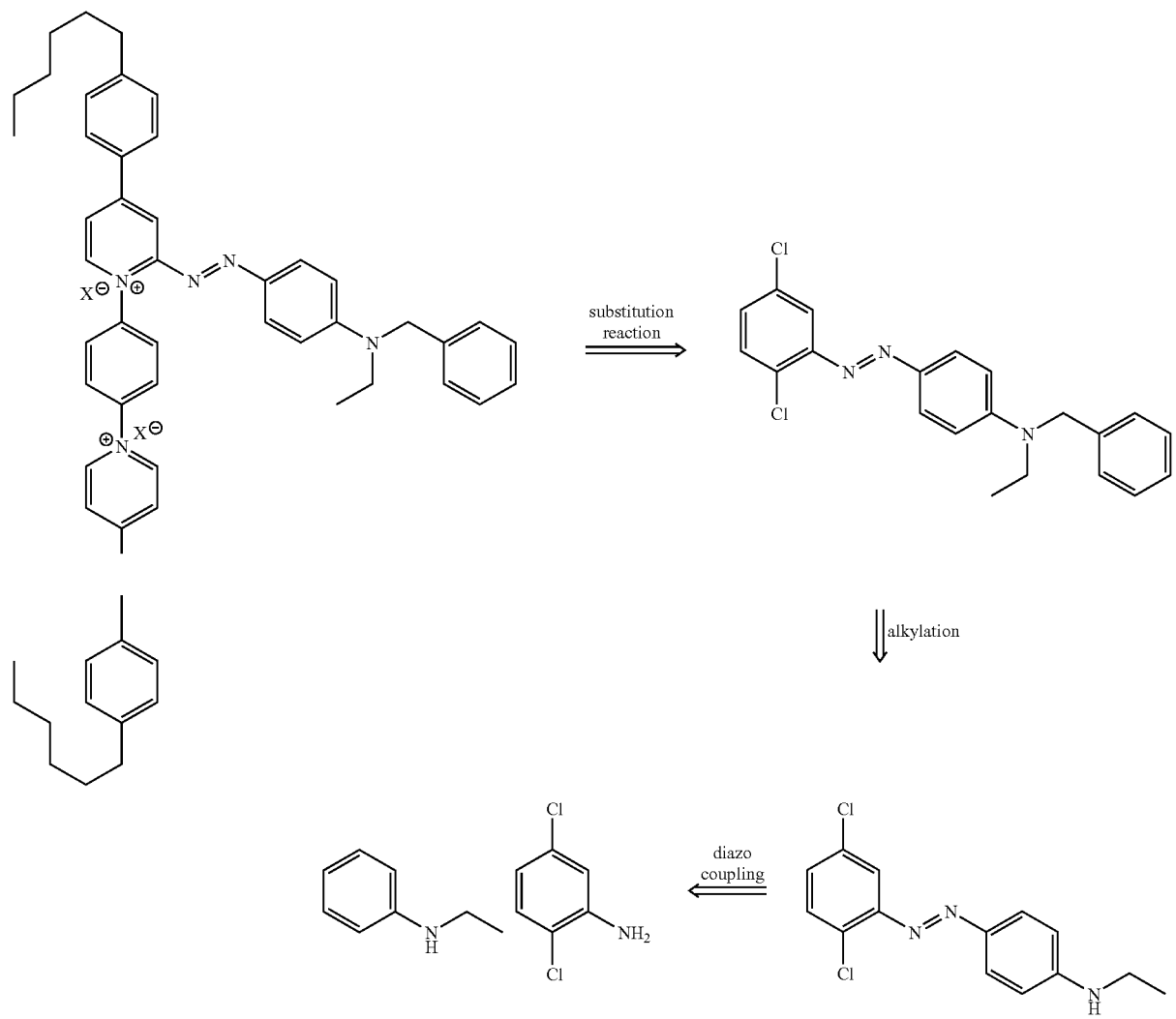

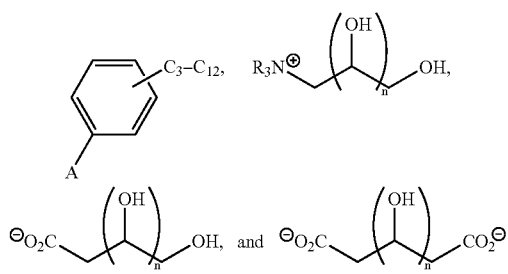

wherein A is a member of the group consisting of $R_3N^+$, $CO_2^-$, and $SO_3^-$, R is a straight alkyl chain comprising between 1 and 3 carbons, and n=3–500.

4. The dye of claim 1, wherein the chromophore comprises a member of the group consisting of sulfonate, carboxylate, an ammonium ion, and any combination of the above.

5. The dye of claim 1, wherein the hydrophilic moiety comprises a member of the group consisting of a polyol, gluconate, glucosamine,

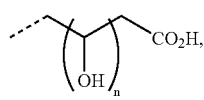

and any combination of the above.

6. The dye of claim 1, wherein the hydrophobic moiety comprises a member of the group consisting of dimethylpyridyl,

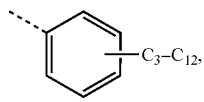

and any combination of the above.

7. The dye of claim 1, wherein the second interaction enhancer is linked to the chromophore via a member of the group consisting of an azo linkage, a diazo linkage, an amino linkage, an imino linkage, an amide linkage, an alkyl chain, a ketone linkage, a sulfonyl amino linkage,

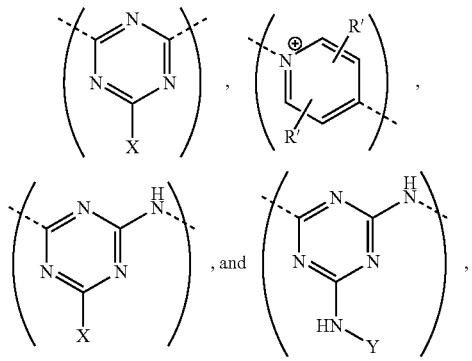

wherein X is a member of the group consisting of chloride, hydroxide, $-N{=}CH-R'$, $-NH-CH_2-R'$, $-NR'_2$, and a chromophoric moiety, Y is a member of the group consisting of a polyol,

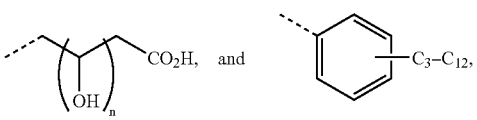

and R' is a member of the group consisting of hydride, a straight alkyl chain having between 1 and 4 carbons, and a branched alkyl chain having 3 or 4 carbons.

8. The dye of claim 1, wherein the linked chromophore and second interaction enhancer comprise a member of

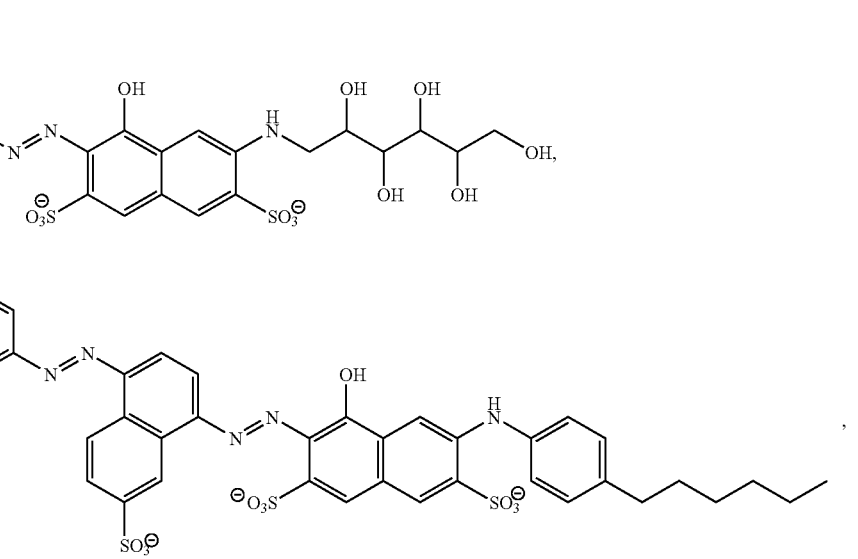

-continued
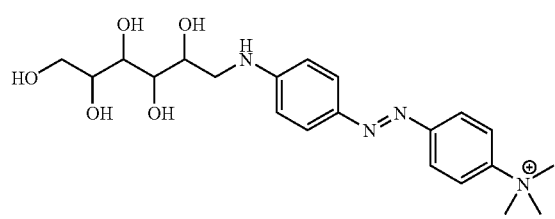
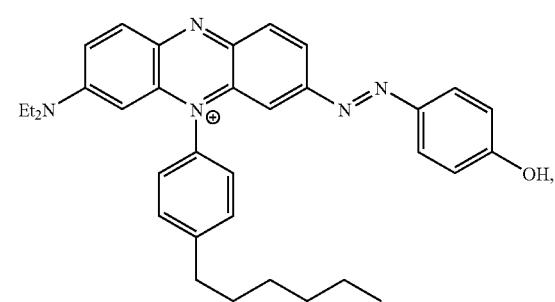
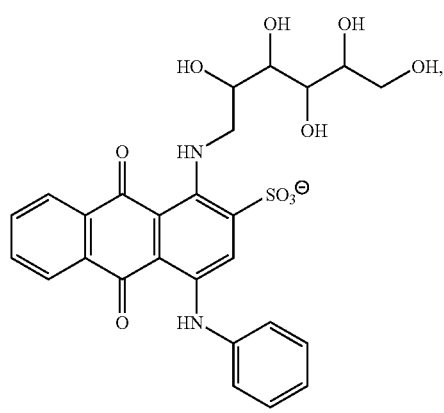
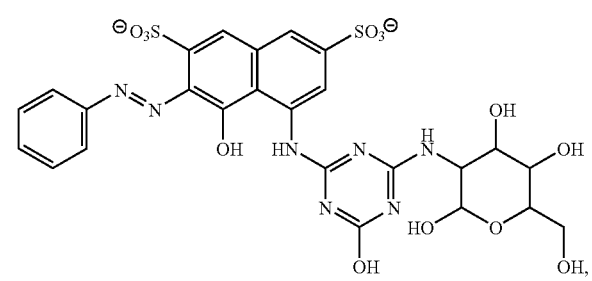
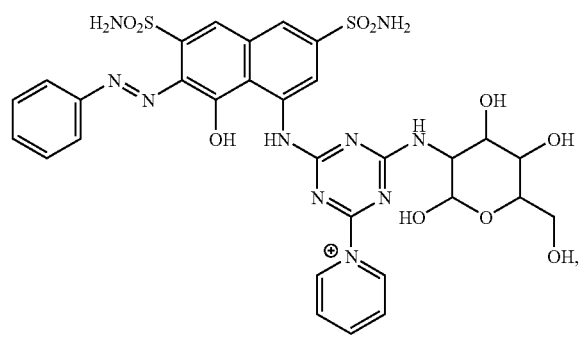
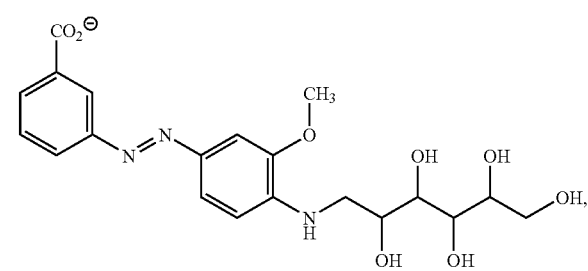
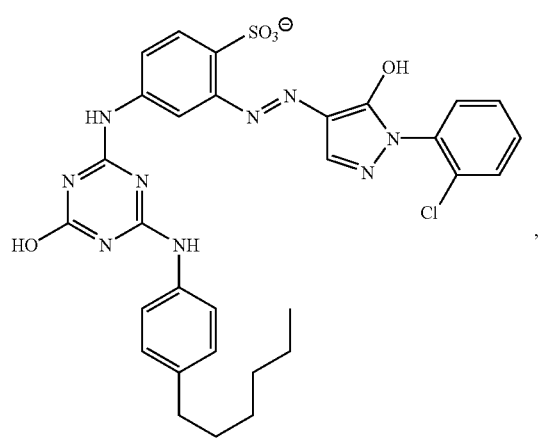
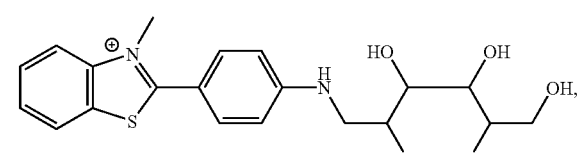

-continued
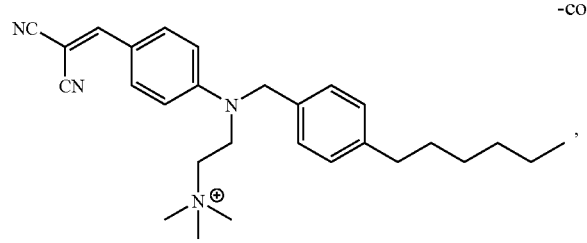
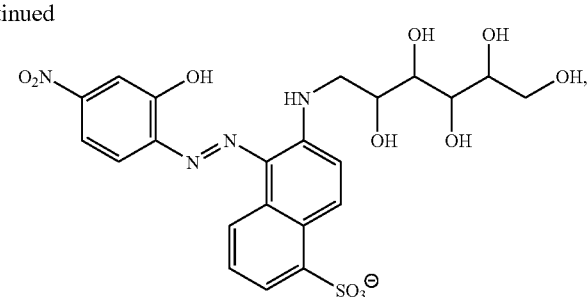
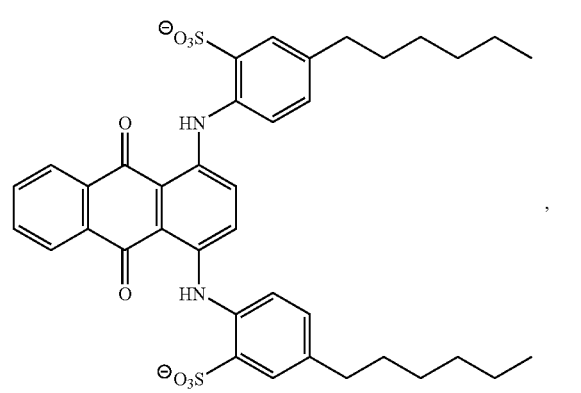
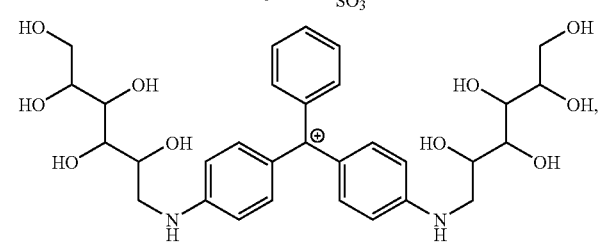
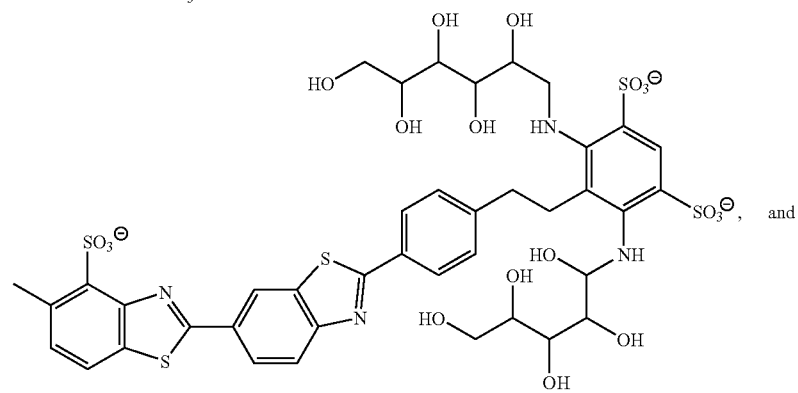
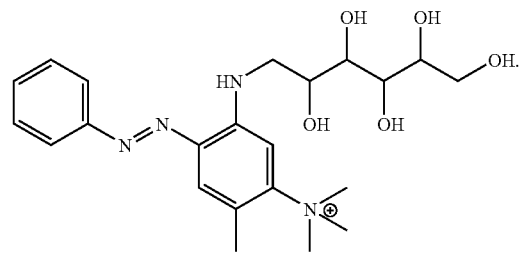
9. The dye of claim 1, wherein the linked chromophore and second interaction enhancer comprise a member of
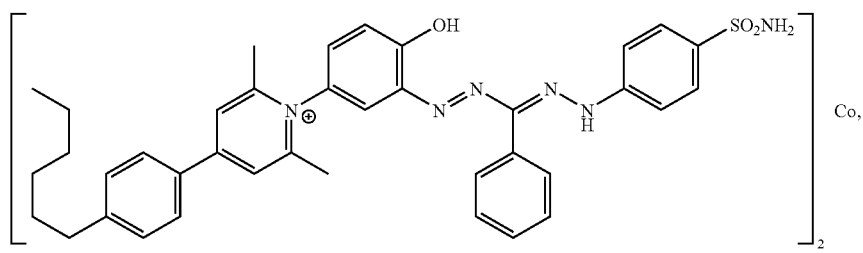

-continued
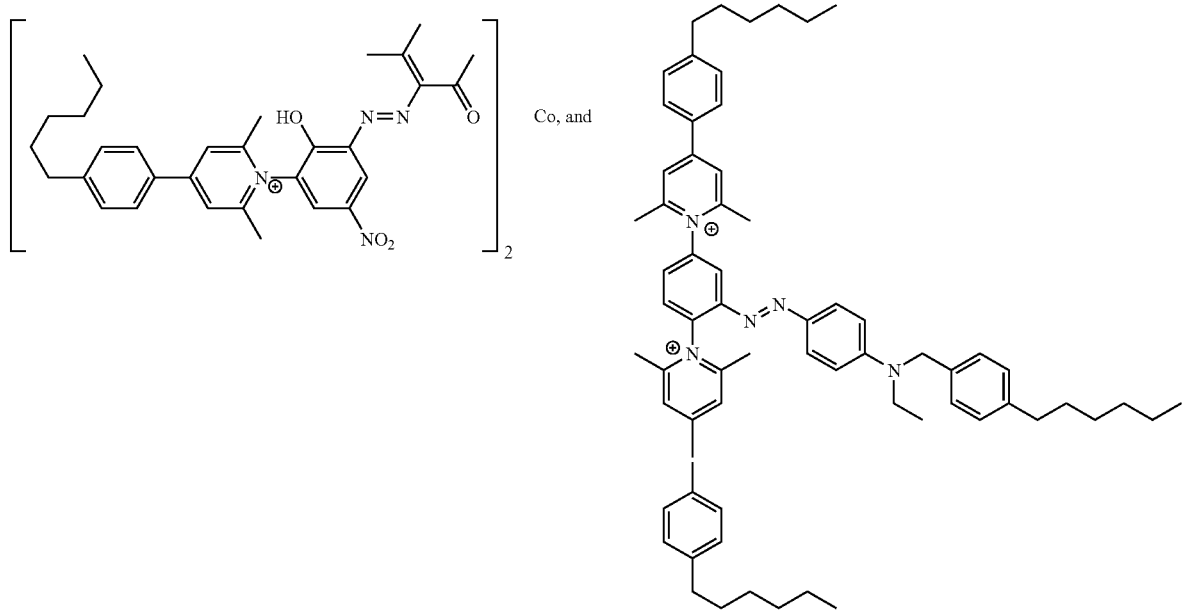
Co, and
10. The dye of claim 1, wherein the linked chromophore and second interaction enhancer comprise a member of
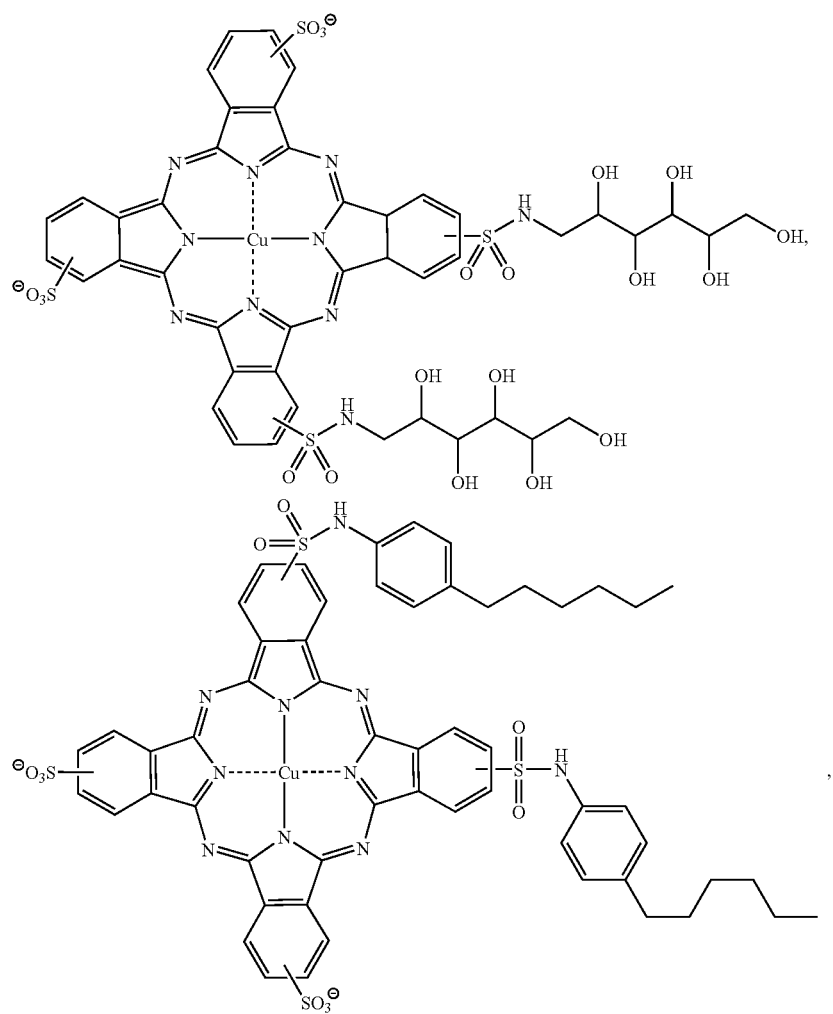

-continued
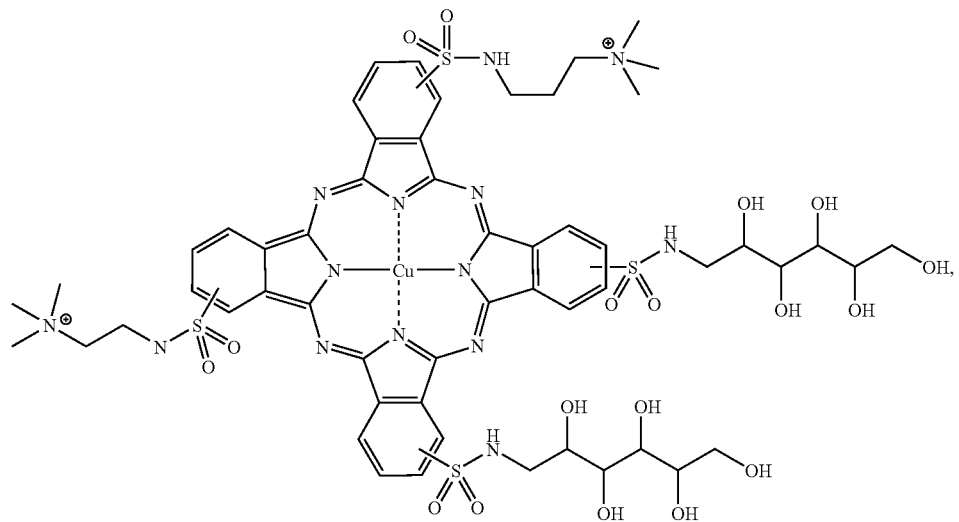
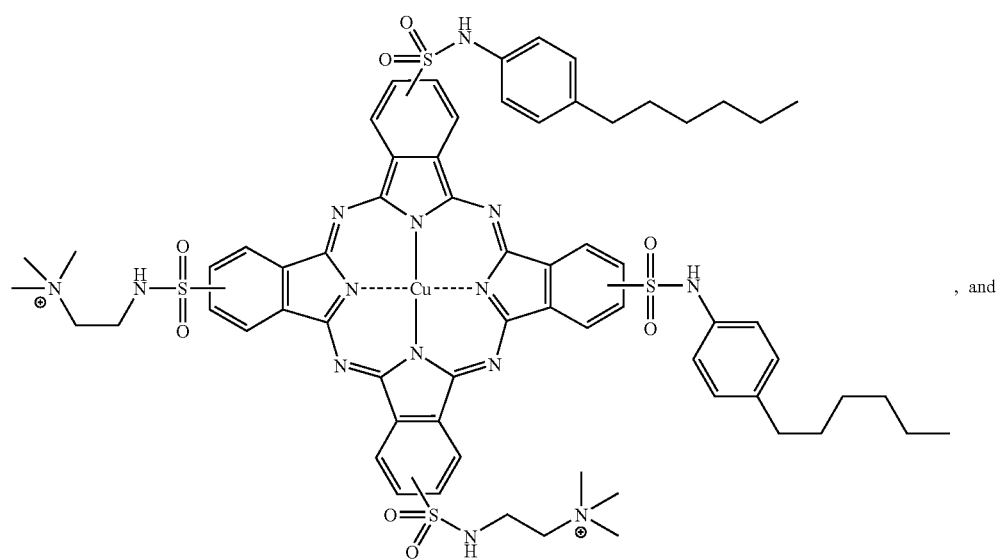, and
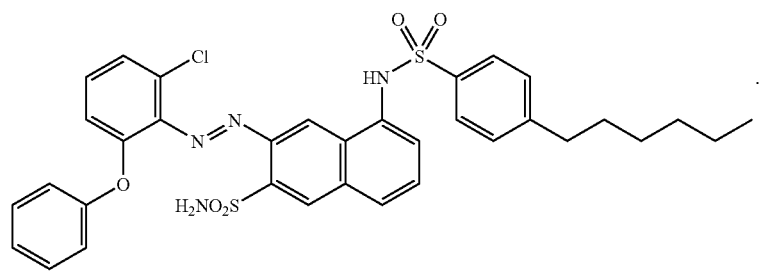

11. The dye of claim 1, wherein the linked chromophore and second interaction enhancer comprise a member of

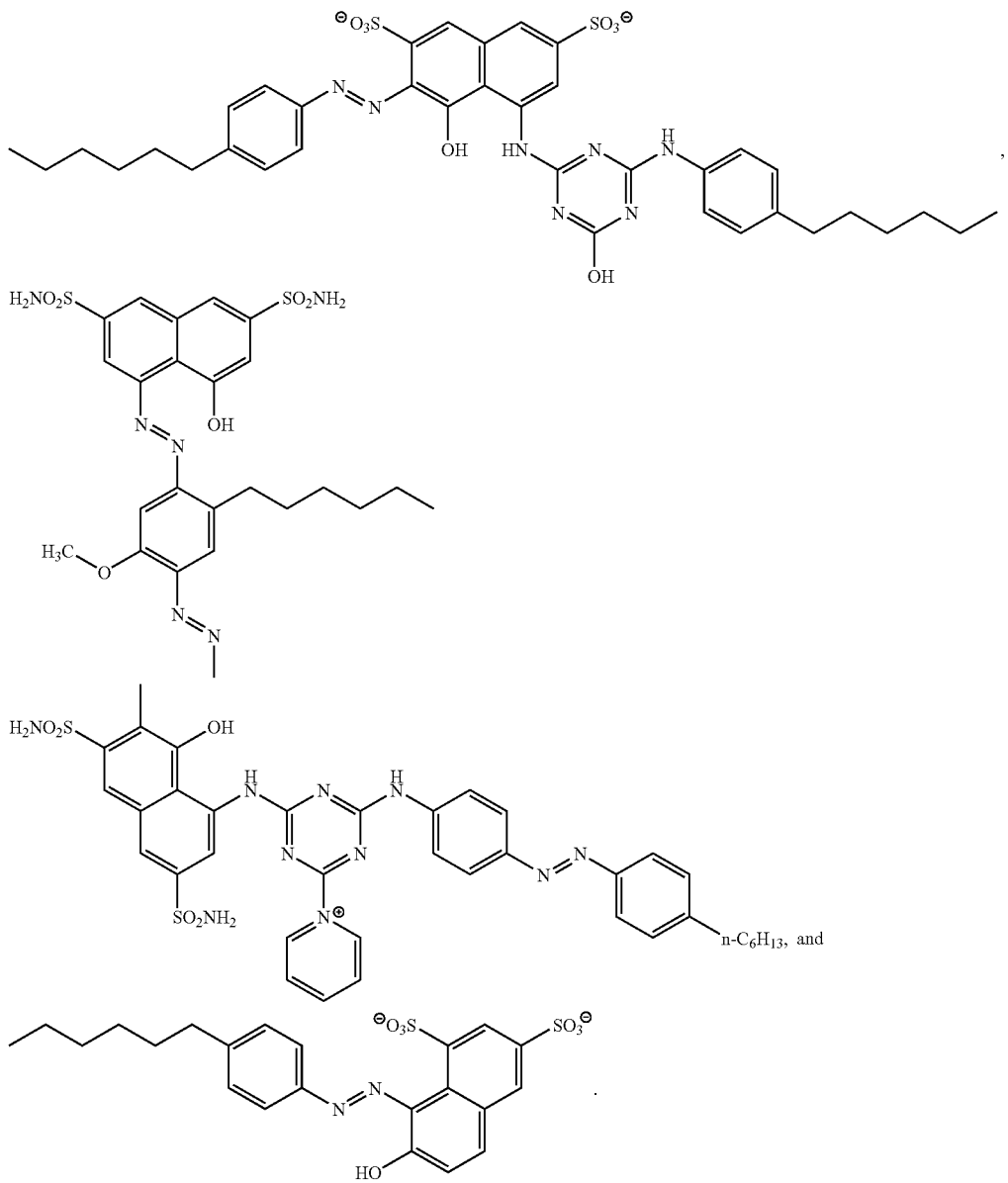

12. An ink, comprising:
    the dye of claim 1;
    a member of the group consisting of a surfactant, a buffer, a humectant, a biocide, an anti-cockle reagent, and any combination of the above.

13. The ink of claim 12, wherein the surfactant comprises a member of the group consisting of a secondary alcohol ethoxyl ate, a non-ionic fluoro surfactant, a non-ionic fatty acid ethoxylate surfactant, a fatty amide ethoxylate surfactant, an ethoxylated silicone surfactant, an acetylenic polyethylene oxide surfactant, and any combination of the above.

14. The ink of claim 12, wherein the buffer comprises a member of the group consisting of an organic biological buffer and an inorganic buffer.

15. The ink of claim 12, wherein a member of the humectant and the anti-cockle reagent is selected from the group consisting of nitrogen-containing heterocyclic ketones, diols, glycol ethers, thioglycol ethers, polyalkylene glycols, ethers of two or more glycols, and any combination thereof.

16. A method of increasing the interaction of an ionic dye with a substrate, comprising,
    associating a first counterion with the ionic dye,
    wherein the first counterion comprises a member of a hydrophilic moiety and a hydrophobic moiety.

17. The method of claim 16, further comprising associating a second counterion with the ionic dye, wherein the second counterion comprises a member of a hydrophilic moiety and a hydrophobic moiety.

18. The method of claim 16, wherein the first counterion comprises a charged nitrogen atom, sulfonate, or carboxylate.

19. The method of claim 16, wherein the first counterion comprises a member of the group consisting of gluconate, glucosamine,

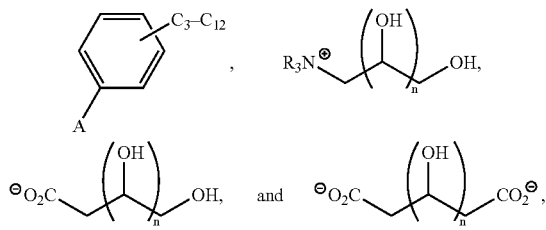

wherein A is a member of the group consisting of $R_3N^+$, $CO_2^-$, and $SO_3^-$, R is a straight alkyl chain comprising between 1 and 3 carbons, and n=3–500.

20. A method of increasing the interaction of a dye with a substrate, comprising covalently attaching at least one member of a hydrophilic and a hydrophobic moiety to the dye.

21. The method of claim 20, wherein the hydrophilic moiety comprises a member of the group consisting of a polyol, gluconate, glucosamine,

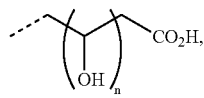

and any combination of the above.

22. The method of claim 20, wherein the hydrophobic moiety comprises a member of the group consisting of dimethylpyridyl,

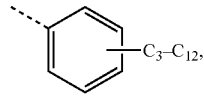

and any combination of the above.

23. The method of claim 20, wherein the at least one member is linked to the dye via a member of the group consisting of an azo linkage, a diazo linkage, an amino linkage, an imino linkage, an amide linkage, an alkyl chain, a ketone linkage, a sulfonyl amino linkage,

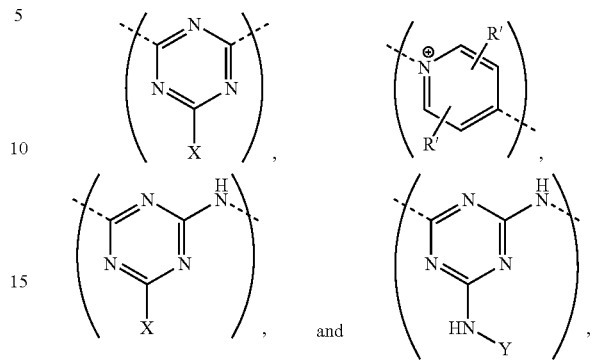

wherein X is a member of the group consisting of chloride, hydroxide, —N=CH—R', —NH—CH$_2$—R', —NR'$_2$, and a chromophoric moiety, Y is a member of the group consisting of a polyol,

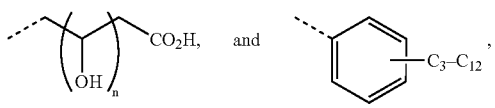

and R' is a member of the group consisting of hydride, a straight alkyl chain having between 1 and 4 carbons, and a branched alkyl chain having 3 or 4 carbons.

24. The method of claim 20, wherein the at least one member comprises 2,6-dimethylpyridine.

* * * * *

UNITED STATES PATENT AND TRADEMARK OFFICE
CERTIFICATE OF CORRECTION

PATENT NO. : 7,094,277 B2
APPLICATION NO. : 10/004148
DATED : August 22, 2006
INVENTOR(S) : Schut et al.

It is certified that error appears in the above-identified patent and that said Letters Patent is hereby corrected as shown below:

In the Claims

Col. 44 (line 1), delete line 1 and insert therefor --group consisting of nitrogen-containing heterocyclic--.

Col. 44 (line 2), delete line 2 and insert therefor --ketones, diols, glycol ethers, thioglycol ethers, polyalkylene--.

Col. 46 (line 2), delete "linkage,.an" and insert therefor --linkage, an--.

Signed and Sealed this

Twelfth Day of June, 2007

JON W. DUDAS
*Director of the United States Patent and Trademark Office*